United States Patent
Warren

(10) Patent No.: US 9,451,068 B2
(45) Date of Patent: Sep. 20, 2016

(54) EYEGLASSES WITH ELECTRONIC COMPONENTS

(71) Applicant: Oakley, Inc., Foothill Ranch, CA (US)

(72) Inventor: Peter Warren, Chattanooga, TN (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 14/336,872

(22) Filed: Jul. 21, 2014

(65) Prior Publication Data

US 2014/0329519 A1   Nov. 6, 2014

Related U.S. Application Data

(63) Continuation of application No. 13/923,133, filed on Jun. 20, 2013, now Pat. No. 8,787,970, which is a continuation of application No. 13/220,517, filed on Aug. 29, 2011, now Pat. No. 8,473,004, which is a
(Continued)

(51) Int. Cl.
| | |
|---|---|
| *H04B 7/00* | (2006.01) |
| *H04R 1/02* | (2006.01) |
| *H04M 1/60* | (2006.01) |
| *A42B 1/24* | (2006.01) |
| *G02C 11/06* | (2006.01) |

(Continued)

(52) U.S. Cl.
CPC ............ *H04M 1/6066* (2013.01); *A42B 1/245* (2013.01); *G02C 11/06* (2013.01); *G02C 11/10* (2013.01); *H04B 1/385* (2013.01); *H04M 1/05* (2013.01); *H04B 2001/3866* (2013.01); *H04M 2250/02* (2013.01)

(58) Field of Classification Search
CPC .......... H04B 7/00; G02C 11/00; G02C 11/10
USPC ...... 455/41.2, 556.1, 569.1, 575.2; 351/158; 381/374, 375, 376
See application file for complete search history.

(56) References Cited

U.S. PATENT DOCUMENTS

| | | | |
|---|---|---|---|
| 1,026,272 A | 5/1912 | Leveque | |
| 1,370,806 A | 3/1921 | Garner | |

(Continued)

FOREIGN PATENT DOCUMENTS

| | | | | |
|---|---|---|---|---|
| CA | 02307869 | * | 4/2000 | ............... G02C 1/00 |
| CH | 660531 | | 4/1987 | |

(Continued)

OTHER PUBLICATIONS

Ajluni, Cheryl. "Wearable Wireless Redefines Computer Usage", Wireless Systems Design, pp. 14-16, Dec. 2002.

(Continued)

*Primary Examiner* — Blane J Jackson
(74) *Attorney, Agent, or Firm* — Knobbe Martens Olson & Bear, LLP

(57) ABSTRACT

A microphone, transmitter, speaker, receiver, and power source, all mounted to an eyeglasses frame, for sending and receiving signals wirelessly to and from a remote cell phone or other electronic device. The microphone and the transmitter can be mounted to extension arms that can be extended, pivoted, or otherwise moved to a position for use, and then moved to a stored position when not in use. Alternatively, the microphone, transmitter, speaker, receiver, and power source, can be mounted onto a clip-on or other attachment member that mounts onto a conventional eyeglasses frame, or to a hat or other article worn on the head.

19 Claims, 8 Drawing Sheets

Related U.S. Application Data continuation of application No. 12/859,162, filed on Aug. 18, 2010, now Pat. No. 8,010,156, which is a continuation of application No. 11/418,154, filed on May 3, 2006, now abandoned, which is a continuation of application No. 11/371,692, filed on Mar. 9, 2006, now Pat. No. 7,231,038, which is a continuation of application No. 09/888,280, filed on Jun. 21, 2001, now Pat. No. 7,013,009.

(51) Int. Cl.
*H04B 1/3827* (2015.01)
*H04M 1/05* (2006.01)
*G02C 11/00* (2006.01)

(56) References Cited

U.S. PATENT DOCUMENTS

| | | |
|---|---|---|
| D130,310 S | 11/1941 | Monjar |
| 2,424,935 A | 7/1947 | Kimmel |
| 2,482,195 A | 9/1949 | Martin |
| 2,504,524 A | 4/1950 | Hayward |
| 2,688,900 A | 9/1954 | Silverman |
| 2,856,466 A | 10/1958 | Gustafson et al. |
| 2,882,348 A | 4/1959 | Erickson |
| 2,915,598 A | 12/1959 | Brunton |
| 2,947,822 A | 8/1960 | Matsuura |
| 2,999,136 A | 9/1961 | Holt et al. |
| 3,104,290 A | 9/1963 | Rosemond et al. |
| 3,119,903 A | 1/1964 | Rosemond et al. |
| D201,050 S | 5/1965 | Gieseking et al. |
| 3,247,330 A | 4/1966 | Hinman |
| D207,919 S | 6/1967 | Lui Fai |
| 3,327,836 A | 6/1967 | Burt |
| 3,371,979 A | 3/1968 | Catanzaro |
| D212,863 S | 12/1968 | Roberts |
| 3,495,898 A | 2/1970 | Del Vecchio |
| 3,536,385 A | 10/1970 | Johnston |
| 3,588,384 A | 6/1971 | Negley |
| 3,665,122 A | 5/1972 | Weiss |
| D228,677 S | 10/1973 | Wichers |
| 3,769,663 A | 11/1973 | Pearl |
| D229,974 S | 1/1974 | Wichers et al. |
| 3,809,829 A | 5/1974 | Vignini et al. |
| 3,853,393 A | 12/1974 | Fila et al. |
| 3,883,701 A | 5/1975 | Delorenzo |
| 3,943,925 A | 3/1976 | Leight |
| 3,957,184 A | 5/1976 | Shurman |
| 4,006,974 A | 2/1977 | Resnick |
| 4,149,780 A | 4/1979 | Young |
| 4,247,178 A | 1/1981 | Cook |
| 4,283,127 A | 8/1981 | Rosenwinkel et al. |
| 4,294,792 A | 10/1981 | Arons et al. |
| 4,516,157 A | 5/1985 | Campbell |
| 4,537,612 A | 8/1985 | Borrelli et al. |
| 4,550,984 A | 11/1985 | Reymond |
| 4,584,721 A | 4/1986 | Yamamoto |
| 4,600,077 A | 7/1986 | Drever |
| D287,021 S | 12/1986 | Johnson |
| 4,636,048 A | 1/1987 | Jones |
| 4,683,587 A | 7/1987 | Silverman |
| D292,986 S | 12/1987 | Magestro |
| 4,712,244 A | 12/1987 | Zwicker |
| 4,773,095 A | 9/1988 | Zwicker |
| 4,803,487 A | 2/1989 | Willard et al. |
| 4,806,008 A | 2/1989 | Tarloff |
| 4,806,011 A | 2/1989 | Bettinger |
| 4,856,086 A | 8/1989 | McCullough |
| 4,869,575 A | 9/1989 | Kubik |
| 4,877,320 A | 10/1989 | Holden |
| 4,882,769 A | 11/1989 | Gallimore |
| 4,901,355 A | 2/1990 | Moore |
| 4,902,120 A | 2/1990 | Weyer |
| 4,904,078 A | 2/1990 | Gorike |
| 4,942,629 A | 7/1990 | Stadlmann |
| 4,943,152 A | 7/1990 | Whelen |
| 5,020,150 A | 5/1991 | Shannon |
| 5,029,216 A | 7/1991 | Jhabvala |
| 5,050,150 A | 9/1991 | Ikeda |
| D325,590 S | 4/1992 | Galy |
| 5,123,726 A | 6/1992 | Webster |
| 5,137,342 A | 8/1992 | Jannard |
| 5,159,639 A | 10/1992 | Shannon et al. |
| 5,185,620 A | 2/1993 | Cooper |
| 5,249,001 A | 9/1993 | Jannard |
| 5,260,997 A | 11/1993 | Gattey |
| 5,281,957 A | 1/1994 | Schoolman |
| 5,321,443 A | 6/1994 | Huber et al. |
| 5,327,178 A | 7/1994 | McManigal |
| 5,335,285 A | 8/1994 | Gluz |
| 5,353,378 A | 10/1994 | Hoffman et al. |
| 5,367,345 A | 11/1994 | da Silva |
| 5,381,114 A | 1/1995 | Pena-Finol et al. |
| 5,404,385 A | 4/1995 | Ben-Haim |
| 5,406,340 A | 4/1995 | Hoff |
| 5,452,480 A | 9/1995 | Ryden |
| RE35,051 E | 10/1995 | Moore |
| 5,459,533 A | 10/1995 | McCooeye et al. |
| 5,481,763 A | 1/1996 | Brostrom et al. |
| 5,483,303 A | 1/1996 | Hirschman |
| 5,483,691 A | 1/1996 | Heck et al. |
| 5,533,130 A | 7/1996 | Staton |
| 5,563,951 A | 10/1996 | Wang et al. |
| 5,579,400 A | 11/1996 | Ballein |
| 5,581,492 A | 12/1996 | Janik |
| 5,583,584 A | 12/1996 | Friedman |
| 5,585,871 A | 12/1996 | Linden |
| 5,590,417 A | 12/1996 | Rydbeck |
| 5,606,743 A | 2/1997 | Vogt et al. |
| 5,608,808 A | 3/1997 | da Silva |
| 5,613,222 A | 3/1997 | Guenther |
| 5,617,477 A | 4/1997 | Boyden |
| 5,634,201 A | 5/1997 | Mooring |
| 5,654,786 A | 8/1997 | Bylander |
| 5,658,502 A | 8/1997 | Hughes |
| 5,668,867 A | 9/1997 | Nagai |
| 5,671,035 A | 9/1997 | Barnes |
| 5,671,037 A | 9/1997 | Ogasawara et al. |
| 5,680,465 A | 10/1997 | Boyden |
| 5,682,434 A | 10/1997 | Boyden |
| 5,694,475 A | 12/1997 | Boyden |
| 5,703,670 A | 12/1997 | Callard |
| 5,708,724 A | 1/1998 | Burris et al. |
| 5,715,323 A | 2/1998 | Walker |
| 5,715,337 A | 2/1998 | Spitzer |
| 5,717,479 A | 2/1998 | Rickards |
| 5,721,783 A | 2/1998 | Anderson |
| D392,990 S | 3/1998 | Hall et al. |
| 5,737,436 A | 4/1998 | Boyden |
| 5,757,929 A | 5/1998 | Wang et al. |
| 5,760,868 A | 6/1998 | Jannard et al. |
| 5,777,715 A | 7/1998 | Kruegle et al. |
| 5,781,272 A | 7/1998 | Bright et al. |
| 5,796,341 A | 8/1998 | Stratiotis |
| 5,805,261 A | 9/1998 | Houston et al. |
| 5,815,126 A | 9/1998 | Fan et al. |
| 5,835,185 A | 11/1998 | Kallman et al. |
| 5,853,005 A | 12/1998 | Scanlon |
| 5,867,572 A | 2/1999 | MacDonald et al. |
| 5,886,822 A | 3/1999 | Spitzer |
| 5,889,843 A | 3/1999 | Singer et al. |
| 5,892,564 A | 4/1999 | Rahn |
| 5,903,395 A | 5/1999 | Rallison et al. |
| 5,909,498 A | 6/1999 | Smith |
| 5,924,868 A | 7/1999 | Rod |
| 5,953,000 A | 9/1999 | Weirich |
| 5,953,434 A | 9/1999 | Boyden |
| 5,973,728 A | 10/1999 | Levitan |
| 5,978,689 A | 11/1999 | Tuoriniemi et al. |
| 5,986,813 A | 11/1999 | Saikawa et al. |
| 5,988,812 A | 11/1999 | Wingate |
| 5,991,085 A | 11/1999 | Rallison et al. |
| 5,995,592 A | 11/1999 | Shirai et al. |

(56) References Cited

U.S. PATENT DOCUMENTS

| | | | |
|---|---|---|---|
| D418,153 S | 12/1999 | Haney | |
| 6,006,115 A | 12/1999 | Wingate | |
| 6,007,035 A | 12/1999 | Feinbloom et al. | |
| 6,010,216 A | 1/2000 | Jesiek | |
| 6,012,812 A * | 1/2000 | Rickards | 351/158 |
| 6,013,108 A | 1/2000 | Karolys et al. | |
| 6,018,742 A | 1/2000 | Herbert, III | |
| 6,023,241 A | 2/2000 | Clapper | |
| 6,023,372 A | 2/2000 | Spitzer et al. | |
| 6,030,342 A | 2/2000 | Amano et al. | |
| 6,057,966 A | 5/2000 | Carroll et al. | |
| D426,845 S | 6/2000 | Green et al. | |
| 6,074,060 A | 6/2000 | Bruce | |
| 6,084,555 A | 7/2000 | Mizoguchi et al. | |
| 6,084,556 A | 7/2000 | Zwern | |
| 6,091,546 A | 7/2000 | Spitzer | |
| 6,091,812 A | 7/2000 | Iglehart et al. | |
| 6,091,832 A | 7/2000 | Shurman et al. | |
| D430,145 S | 8/2000 | Boyden et al. | |
| 6,106,116 A | 8/2000 | Houston et al. | |
| 6,108,197 A | 8/2000 | Janik | |
| 6,110,110 A | 8/2000 | Dublin, Jr. et al. | |
| 6,126,595 A | 10/2000 | Amano et al. | |
| 6,142,623 A | 11/2000 | Jones | |
| 6,149,272 A | 11/2000 | Bergner et al. | |
| D435,058 S | 12/2000 | Green et al. | |
| 6,157,533 A | 12/2000 | Sallam et al. | |
| 6,169,543 B1 | 1/2001 | Wehmeyer | |
| 6,176,576 B1 | 1/2001 | Green et al. | |
| 6,181,956 B1 | 1/2001 | Koskan | |
| 6,192,253 B1 | 2/2001 | Charlier et al. | |
| 6,204,974 B1 | 3/2001 | Spitzer | |
| 6,211,799 B1 | 4/2001 | Post et al. | |
| 6,212,414 B1 | 4/2001 | Alameh et al. | |
| 6,212,424 B1 | 4/2001 | Robinson | |
| 6,218,958 B1 | 4/2001 | Eichstaedt et al. | |
| D441,388 S | 5/2001 | Lightman | |
| 6,225,897 B1 | 5/2001 | Doyle et al. | |
| 6,230,327 B1 | 5/2001 | Briand et al. | |
| 6,231,181 B1 | 5/2001 | Swab | |
| 6,233,344 B1 | 5/2001 | Clegg et al. | |
| 6,233,345 B1 | 5/2001 | Urwyler | |
| 6,239,778 B1 | 5/2001 | Palffy-Muhoray et al. | |
| 6,243,578 B1 | 6/2001 | Koike | |
| 6,252,970 B1 | 6/2001 | Poon et al. | |
| D445,416 S | 7/2001 | Glezerman | |
| 6,272,359 B1 | 8/2001 | Kivela et al. | |
| 6,280,838 B1 | 8/2001 | Bernards et al. | |
| 6,285,757 B1 | 9/2001 | Carroll et al. | |
| 6,292,213 B1 | 9/2001 | Jones | |
| 6,301,050 B1 | 10/2001 | DeLeon | |
| 6,301,367 B1 | 10/2001 | Boyden et al. | |
| 6,301,593 B1 | 10/2001 | Toyosato | |
| 6,307,526 B1 | 10/2001 | Mann | |
| 6,311,155 B1 | 10/2001 | Vaudrey et al. | |
| 6,312,811 B1 | 11/2001 | Frigoli et al. | |
| 6,314,091 B1 | 11/2001 | LaRowe, Jr. et al. | |
| 6,325,507 B1 | 12/2001 | Jannard et al. | |
| 6,325,513 B1 | 12/2001 | Bergner et al. | |
| 6,344,727 B1 | 2/2002 | Desai et al. | |
| 6,347,095 B1 | 2/2002 | Tang et al. | |
| 6,349,001 B1 | 2/2002 | Spitzer | |
| 6,350,129 B1 | 2/2002 | Gorlick | |
| 6,351,468 B1 | 2/2002 | LaRowe, Jr. et al. | |
| 6,353,422 B1 | 3/2002 | Perlman | |
| 6,353,503 B1 | 3/2002 | Spitzer et al. | |
| 6,356,392 B1 | 3/2002 | Spitzer | |
| 6,374,177 B1 | 4/2002 | Lee et al. | |
| 6,381,484 B1 | 4/2002 | Ayanruoh | |
| 6,384,982 B1 | 5/2002 | Spitzer | |
| 6,392,798 B1 | 5/2002 | Newkirk | |
| 6,409,338 B1 | 6/2002 | Jewell | |
| 6,417,969 B1 | 7/2002 | DeLuca et al. | |
| 6,421,031 B1 | 7/2002 | Ronzani et al. | |
| 6,424,820 B1 | 7/2002 | Burdick et al. | |
| 6,431,705 B1 | 8/2002 | Linden | |
| 6,442,018 B1 | 8/2002 | Dinkin | |
| D462,708 S | 9/2002 | Miller et al. | |
| D462,946 S | 9/2002 | Beraut et al. | |
| 6,445,805 B1 | 9/2002 | Grugel | |
| 6,452,572 B1 | 9/2002 | Fan et al. | |
| 6,452,699 B1 | 9/2002 | Athale et al. | |
| 6,456,721 B1 | 9/2002 | Fukuda | |
| 6,474,816 B2 | 11/2002 | Butler | |
| 6,476,815 B1 | 11/2002 | Ando | |
| 6,483,483 B2 | 11/2002 | Kosugi et al. | |
| 6,490,362 B1 | 12/2002 | Clegg et al. | |
| 6,493,136 B2 | 12/2002 | Chang et al. | |
| 6,510,325 B1 | 1/2003 | Mack, II et al. | |
| 6,517,203 B1 | 2/2003 | Blum et al. | |
| 6,519,475 B1 | 2/2003 | Kim | |
| 6,523,006 B1 | 2/2003 | Ellis et al. | |
| 6,529,804 B1 | 3/2003 | Draggon et al. | |
| 6,538,799 B2 | 3/2003 | Spitzer | |
| 6,540,347 B1 | 4/2003 | Radziwon et al. | |
| 6,542,081 B2 | 4/2003 | Torch | |
| 6,546,101 B1 | 4/2003 | Murray et al. | |
| 6,549,122 B2 | 4/2003 | Depta | |
| 6,554,763 B1 | 4/2003 | Amano et al. | |
| 6,560,029 B1 | 5/2003 | Dobbie et al. | |
| 6,560,449 B1 | 5/2003 | Liu | |
| 6,564,047 B1 | 5/2003 | Steele et al. | |
| 6,567,651 B2 | 5/2003 | Whitley | |
| 6,580,405 B1 | 6/2003 | Yamazaki et al. | |
| 6,582,075 B1 | 6/2003 | Swab et al. | |
| 6,614,407 B2 | 9/2003 | Perlman | |
| 6,618,099 B1 | 9/2003 | Spitzer | |
| 6,629,076 B1 | 9/2003 | Haken | |
| 6,639,706 B2 | 10/2003 | Ziv et al. | |
| 6,650,894 B1 | 11/2003 | Berstis et al. | |
| 6,657,673 B2 | 12/2003 | Ishikawa | |
| 6,687,486 B2 | 2/2004 | Grzeczkowski | |
| 6,690,807 B1 | 2/2004 | Meyer | |
| 6,691,028 B2 | 2/2004 | Bullock et al. | |
| 6,717,533 B2 | 4/2004 | Seaberg et al. | |
| 6,724,354 B1 | 4/2004 | Spitzer et al. | |
| 6,725,022 B1 | 4/2004 | Clayton et al. | |
| 6,728,531 B1 | 4/2004 | Lee et al. | |
| 6,729,726 B2 | 5/2004 | Miller et al. | |
| 6,731,908 B2 | 5/2004 | Berliner et al. | |
| 6,733,130 B2 | 5/2004 | Blum et al. | |
| 6,735,435 B2 | 5/2004 | Newell et al. | |
| 6,736,759 B1 | 5/2004 | Stubbs et al. | |
| 6,739,873 B1 | 5/2004 | Rod et al. | |
| 6,763,119 B2 | 7/2004 | Lee | |
| 6,766,182 B2 | 7/2004 | Janninck et al. | |
| 6,769,767 B2 | 8/2004 | Swab et al. | |
| 6,783,501 B2 | 8/2004 | Takahashi et al. | |
| 6,816,314 B2 | 11/2004 | Shimizu et al. | |
| 6,834,192 B1 | 12/2004 | Watanabe et al. | |
| 6,834,509 B2 | 12/2004 | Palfy et al. | |
| 6,851,805 B2 | 2/2005 | Blum et al. | |
| 6,871,951 B2 | 3/2005 | Blum et al. | |
| 6,873,862 B2 | 3/2005 | Reshefsky | |
| 6,879,443 B2 | 4/2005 | Spitzer | |
| 6,885,848 B2 * | 4/2005 | Lee | 455/41.2 |
| 6,911,172 B2 | 6/2005 | Swab et al. | |
| 6,912,386 B1 | 6/2005 | Himberg et al. | |
| 6,920,283 B2 | 7/2005 | Goldstein | |
| 6,929,365 B2 | 8/2005 | Swab et al. | |
| 6,937,400 B2 | 8/2005 | Olsson | |
| 6,937,803 B2 | 8/2005 | Bruegl | |
| 6,941,248 B2 | 9/2005 | Friedrich et al. | |
| 6,947,014 B2 | 9/2005 | Wooten | |
| 6,950,531 B2 | 9/2005 | Rickards | |
| 6,957,890 B2 | 10/2005 | Shapiro | |
| 6,966,647 B2 | 11/2005 | Jannard et al. | |
| 6,975,667 B2 | 12/2005 | Mattisson et al. | |
| 6,978,162 B2 | 12/2005 | Russell et al. | |
| 6,990,082 B1 | 1/2006 | Zehavi et al. | |
| 7,004,582 B2 | 2/2006 | Jannard et al. | |
| 7,013,009 B2 | 3/2006 | Warren | |
| 7,031,483 B2 | 4/2006 | Boone et al. | |
| 7,031,667 B2 | 4/2006 | Horiguchi | |

(56) References Cited

U.S. PATENT DOCUMENTS

| | | |
|---|---|---|
| 7,044,615 B2 | 5/2006 | Gesten |
| 7,062,796 B1 | 6/2006 | Dixon |
| 7,084,736 B2 | 8/2006 | Ritter |
| 7,093,742 B2 | 8/2006 | Steven, III et al. |
| 7,097,300 B2 | 8/2006 | Himmele |
| 7,099,464 B2 | 8/2006 | Lucey et al. |
| 7,106,676 B2 | 9/2006 | Matos |
| 7,116,976 B2 | 10/2006 | Thomas et al. |
| 7,124,425 B1 | 10/2006 | Anderson |
| 7,133,532 B2 | 11/2006 | Rickards |
| 7,147,324 B2 | 12/2006 | Jannard et al. |
| 7,149,475 B2 | 12/2006 | Kawamura |
| 7,150,526 B2 | 12/2006 | Jannard et al. |
| 7,158,096 B1 | 1/2007 | Spitzer |
| 7,158,499 B2 | 1/2007 | Anderson et al. |
| 7,162,281 B2 | 1/2007 | Kim |
| 7,168,804 B2 | 1/2007 | Velazquez |
| 7,170,057 B2 | 1/2007 | Filipovich et al. |
| 7,185,983 B2 | 3/2007 | Nelson et al. |
| 7,187,948 B2 | 3/2007 | Alden |
| 7,187,960 B2 | 3/2007 | Abreu |
| 7,192,136 B2 | 3/2007 | Howell et al. |
| 7,192,137 B2 | 3/2007 | Ishibashi et al. |
| 7,195,353 B2 | 3/2007 | Blum et al. |
| 7,211,778 B1 | 5/2007 | Smith et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,242,527 B2 | 7/2007 | Spitzer |
| 7,245,273 B2 | 7/2007 | Eberl et al. |
| 7,253,791 B2 | 8/2007 | Kahan et al. |
| 7,255,437 B2 | 8/2007 | Howell et al. |
| 7,261,409 B1 | 8/2007 | Taber |
| 7,264,350 B2 | 9/2007 | Jannard et al. |
| 7,278,734 B2 | 10/2007 | Jannard et al. |
| 7,289,640 B2 | 10/2007 | Tsai et al. |
| 7,289,767 B2 | 10/2007 | Lai |
| 7,292,703 B2 | 11/2007 | Kaulfuss et al. |
| 7,308,231 B2 | 12/2007 | Tung |
| 7,312,699 B2 | 12/2007 | Chornenky |
| 7,313,246 B2 | 12/2007 | Miller et al. |
| 7,321,785 B2 | 1/2008 | Harris |
| 7,331,666 B2 | 2/2008 | Swab et al. |
| 7,376,434 B2 | 5/2008 | Thomas et al. |
| 7,380,936 B2 | 6/2008 | Howell et al. |
| 7,381,952 B2 | 6/2008 | Teich et al. |
| 7,395,090 B2 | 7/2008 | Alden |
| 7,401,918 B2 | 7/2008 | Howell et al. |
| 7,409,234 B2 | 8/2008 | Glezerman |
| 7,410,254 B2 | 8/2008 | Goodis |
| 7,436,568 B1 | 10/2008 | Kuykendall, Jr. |
| 7,438,409 B2 | 10/2008 | Jordan |
| 7,438,410 B1 | 10/2008 | Howell et al. |
| 7,445,332 B2 | 11/2008 | Jannard et al. |
| 7,451,056 B2 | 11/2008 | Flentov et al. |
| 7,452,073 B2 | 11/2008 | Jannard et al. |
| 7,461,936 B2 | 12/2008 | Jannard |
| 7,467,866 B2 | 12/2008 | Chao |
| 7,481,531 B2 | 1/2009 | Howell et al. |
| 7,484,847 B2 | 2/2009 | Fuziak, Jr. |
| 7,488,294 B2 | 2/2009 | Torch |
| 7,490,936 B2 | 2/2009 | Blum et al. |
| 7,494,216 B2 | 2/2009 | Jannard et al. |
| 7,496,293 B2 | 2/2009 | Shamir et al. |
| 7,500,746 B1 | 3/2009 | Howell et al. |
| 7,500,747 B2 | 3/2009 | Howell et al. |
| 7,512,414 B2 | 3/2009 | Jannard et al. |
| 7,520,614 B2 | 4/2009 | Joos et al. |
| 7,527,375 B2 | 5/2009 | Blum et al. |
| 7,530,688 B2 | 5/2009 | Grogan et al. |
| 7,543,934 B2 | 6/2009 | Howell et al. |
| 7,547,101 B2 | 6/2009 | Fuziak |
| 7,576,800 B2 | 8/2009 | Swain |
| 7,576,919 B2 | 8/2009 | Durner et al. |
| 7,581,833 B2 | 9/2009 | Howell et al. |
| 7,617,071 B2 | 11/2009 | Darley et al. |
| 7,621,634 B2 | 11/2009 | Howell et al. |
| 7,631,968 B1 | 12/2009 | Dobson et al. |
| 7,647,400 B2 | 1/2010 | Abbott et al. |
| 7,648,236 B1 | 1/2010 | Dobson |
| D610,184 S | 2/2010 | Pearson et al. |
| 7,665,845 B2 | 2/2010 | Kiderman et al. |
| 7,675,683 B2 | 3/2010 | Dobson |
| 7,677,722 B1 | 3/2010 | Mednick et al. |
| 7,677,723 B2 | 3/2010 | Howell et al. |
| 7,682,018 B2 | 3/2010 | Jannard |
| 7,724,210 B2 | 5/2010 | Sprague et al. |
| 7,729,688 B2 | 6/2010 | Cheung et al. |
| 7,740,353 B2 | 6/2010 | Jannard |
| 7,744,213 B2 | 6/2010 | Jannard et al. |
| 7,753,523 B2 | 7/2010 | Kiderman et al. |
| 7,758,185 B2 | 7/2010 | Lewis |
| 7,760,898 B2 | 7/2010 | Howell et al. |
| 7,771,046 B2 | 8/2010 | Howell et al. |
| 7,784,935 B2 | 8/2010 | Jackson et al. |
| 7,786,424 B2 | 8/2010 | Durner et al. |
| 7,792,552 B2 | 9/2010 | Thomas et al. |
| 7,798,638 B2 | 9/2010 | Fuziak, Jr. |
| 7,806,525 B2 | 10/2010 | Howell et al. |
| 7,810,750 B2 | 10/2010 | Abreu |
| 7,843,403 B2 | 11/2010 | Spitzer |
| 7,866,818 B2 | 1/2011 | Schroeder et al. |
| 7,869,128 B2 | 1/2011 | Yamaguchi et al. |
| 7,874,669 B2 | 1/2011 | Moritz et al. |
| 7,890,128 B1 | 2/2011 | Thomas et al. |
| 7,900,068 B2 | 3/2011 | Spitzer |
| 7,918,556 B2 | 4/2011 | Lewis |
| 7,922,321 B2 | 4/2011 | Howell et al. |
| 7,931,367 B2 | 4/2011 | Jackson et al. |
| 7,931,373 B2 | 4/2011 | Hillis et al. |
| 7,959,287 B1 | 6/2011 | Saffra |
| 7,967,433 B2 | 6/2011 | Jannard et al. |
| 7,967,435 B1 | 6/2011 | Seeto |
| 7,971,994 B2 | 7/2011 | Blum et al. |
| 7,988,283 B2 | 8/2011 | Jananrd |
| 7,997,723 B2 | 8/2011 | Pienimaa et al. |
| 8,010,156 B2 | 8/2011 | Warren |
| D645,492 S | 9/2011 | Zhao |
| D645,493 S | 9/2011 | Zhao |
| 8,020,989 B2 | 9/2011 | Jannard et al. |
| 8,025,398 B2 | 9/2011 | Janard |
| D646,316 S | 10/2011 | Zhao |
| 8,068,169 B2 | 11/2011 | Chang |
| 8,086,287 B2 | 12/2011 | Mooney et al. |
| 8,104,892 B2 | 1/2012 | Hillis et al. |
| 8,109,629 B2 | 2/2012 | Howell et al. |
| 8,112,104 B1 | 2/2012 | Thomas et al. |
| 8,123,351 B2 | 2/2012 | Moritz et al. |
| 8,128,606 B2 | 3/2012 | Anderson et al. |
| 8,136,170 B2 | 3/2012 | Dipaola |
| 8,188,880 B1 | 5/2012 | Chi et al. |
| 8,204,435 B2 | 6/2012 | Seshadri et al. |
| 8,212,855 B2 | 7/2012 | Gupta et al. |
| 8,243,973 B2 | 8/2012 | Rickards et al. |
| 8,259,159 B2 | 9/2012 | Hu |
| 8,269,159 B2 | 9/2012 | Filipovich et al. |
| 8,280,419 B1 | 10/2012 | Thomas et al. |
| 8,289,231 B2 | 10/2012 | Budd et al. |
| 8,310,555 B2 | 11/2012 | Ludlow |
| 8,313,192 B2 | 11/2012 | Jannard |
| 8,325,263 B2 | 12/2012 | Kato et al. |
| 8,333,475 B2 | 12/2012 | Sugio et al. |
| 8,337,013 B2 | 12/2012 | Howell et al. |
| 8,337,014 B2 | 12/2012 | Kokonaski et al. |
| 8,353,594 B2 | 1/2013 | Lewis |
| 8,378,924 B2 | 2/2013 | Jacobsen et al. |
| 8,414,131 B2 | 4/2013 | Tanaka |
| 8,430,507 B2 | 4/2013 | Howell et al. |
| 8,430,510 B2 | 4/2013 | Sugio et al. |
| 8,431,881 B2 | 4/2013 | Filipovich et al. |
| 8,434,863 B2 | 5/2013 | Howell et al. |
| 8,434,868 B2 | 5/2013 | Sato et al. |
| 8,449,116 B2 | 5/2013 | Sato et al. |

(56) References Cited

U.S. PATENT DOCUMENTS

| | | |
|---|---|---|
| 8,465,151 B2 | 6/2013 | Howell et al. |
| 8,473,004 B2 | 6/2013 | Warren |
| 8,482,488 B2 | 7/2013 | Jannard |
| 8,500,271 B2 | 8/2013 | Howell et al. |
| 8,503,703 B2 | 8/2013 | Eaton et al. |
| 8,523,352 B2 | 9/2013 | Jannard et al. |
| 8,550,621 B2 | 10/2013 | Jannard |
| 8,550,649 B2 | 10/2013 | Nelson et al. |
| 8,553,910 B1 | 10/2013 | Dong et al. |
| 8,566,962 B2 | 10/2013 | Cornelius |
| 8,622,885 B2 | 1/2014 | Mersky |
| 8,721,562 B2 | 5/2014 | Abreu |
| 8,737,978 B1 | 5/2014 | Thomas et al. |
| 8,744,113 B1 | 6/2014 | Rickards |
| 8,744,407 B2 | 6/2014 | Cheung et al. |
| 8,758,021 B2 | 6/2014 | Takahashi |
| 8,770,742 B2 | 7/2014 | Howell et al. |
| 8,787,970 B2 | 7/2014 | Warren |
| 8,801,174 B2 | 8/2014 | Willey |
| 8,854,429 B2 | 10/2014 | Seo et al. |
| 8,855,719 B2 | 10/2014 | Jacobsen et al. |
| 8,876,285 B2 | 11/2014 | Jannard |
| 8,878,914 B2 | 11/2014 | Mashitani et al. |
| 8,891,817 B2 | 11/2014 | Wexler et al. |
| 8,902,303 B2 | 12/2014 | Na'aman et al. |
| 8,905,542 B2 | 12/2014 | Howell et al. |
| 8,920,013 B2 | 12/2014 | Nakamura |
| 8,928,752 B2 | 1/2015 | DeKeyser |
| 9,016,857 B2 | 4/2015 | Benko et al. |
| 9,028,062 B2 | 5/2015 | Kokonaski et al. |
| 2001/0009410 A1 | 7/2001 | Fujita |
| 2001/0038491 A1 | 11/2001 | Fergason |
| 2002/0039063 A1 | 4/2002 | Ritter |
| 2002/0039170 A1 | 4/2002 | Jannard et al. |
| 2002/0044152 A1 | 4/2002 | Abbott, III et al. |
| 2002/0085175 A1 | 7/2002 | Butler |
| 2002/0085843 A1 | 7/2002 | Mann |
| 2002/0087330 A1 | 7/2002 | Lee et al. |
| 2002/0093466 A1 | 7/2002 | Ben-Arie |
| 2002/0098877 A1 | 7/2002 | Glezerman |
| 2002/0098878 A1 | 7/2002 | Mooney et al. |
| 2002/0111197 A1 | 8/2002 | Fitzgerald |
| 2002/0118825 A1 | 8/2002 | Mitra |
| 2002/0143912 A1 | 10/2002 | Michels |
| 2002/0159023 A1 | 10/2002 | Swab et al. |
| 2002/0169539 A1 | 11/2002 | Menard et al. |
| 2002/0170147 A1 | 11/2002 | Heller |
| 2002/0176330 A1 | 11/2002 | Ramonowski et al. |
| 2002/0186180 A1 | 12/2002 | Duda |
| 2002/0197961 A1 | 12/2002 | Warren |
| 2003/0003969 A1 | 1/2003 | Tong et al. |
| 2003/0018274 A1 | 1/2003 | Takahashi et al. |
| 2003/0022690 A1 | 1/2003 | Beyda et al. |
| 2003/0026586 A1 | 2/2003 | Bruegl et al. |
| 2003/0036360 A1 | 2/2003 | Russell et al. |
| 2003/0058406 A1 | 3/2003 | Blum et al. |
| 2003/0067585 A1 | 4/2003 | Miller et al. |
| 2003/0068057 A1 | 4/2003 | Miller et al. |
| 2003/0073460 A1 | 4/2003 | van Pelt et al. |
| 2003/0090439 A1 | 5/2003 | Spitzer |
| 2003/0156725 A1 | 8/2003 | Boone et al. |
| 2003/0162510 A1 | 8/2003 | Kim |
| 2004/0000733 A1 | 1/2004 | Swab et al. |
| 2004/0015403 A1 | 1/2004 | Moskowitz et al. |
| 2004/0029582 A1 | 2/2004 | Swab et al. |
| 2004/0044418 A1 | 3/2004 | Goldstein |
| 2004/0044427 A1 | 3/2004 | Neuhaus |
| 2004/0048569 A1 | 3/2004 | Kawamura |
| 2004/0072134 A1 | 4/2004 | Takahashi |
| 2004/0120035 A1 | 6/2004 | Hoffmann |
| 2004/0128399 A1 | 7/2004 | Kurrasch |
| 2004/0128737 A1 | 7/2004 | Gesten |
| 2004/0132509 A1 | 7/2004 | Glezerman |
| 2004/0136293 A1 | 7/2004 | Matos |
| 2004/0156012 A1 | 8/2004 | Jannard et al. |
| 2004/0157649 A1 | 8/2004 | Jannard et al. |
| 2004/0160571 A1 | 8/2004 | Jannard et al. |
| 2004/0160572 A1 | 8/2004 | Jannard et al. |
| 2004/0160573 A1 | 8/2004 | Jannard et al. |
| 2004/0212776 A1 | 10/2004 | Spitzer et al. |
| 2004/0239874 A1 | 12/2004 | Swab et al. |
| 2004/0240404 A1 | 12/2004 | Ibrahim et al. |
| 2005/0001981 A1 | 1/2005 | Anderson et al. |
| 2005/0040192 A1 | 2/2005 | Steven, III et al. |
| 2005/0041297 A1 | 2/2005 | He et al. |
| 2005/0046789 A1 | 3/2005 | Jannard et al. |
| 2005/0046790 A1 | 3/2005 | Jannard et al. |
| 2005/0052537 A1 | 3/2005 | Mizusawa |
| 2005/0128431 A1 | 6/2005 | Jannard et al. |
| 2005/0159182 A1 | 7/2005 | Lai |
| 2005/0174651 A1 | 8/2005 | Spitzer |
| 2005/0185815 A1 | 8/2005 | Rickards |
| 2005/0186993 A1 | 8/2005 | Yueh |
| 2005/0201585 A1 | 9/2005 | Jannard et al. |
| 2005/0202857 A1 | 9/2005 | Seshadri et al. |
| 2005/0208457 A1 | 9/2005 | Fink et al. |
| 2005/0208893 A1 | 9/2005 | Yueh |
| 2005/0219152 A1 | 10/2005 | Budd et al. |
| 2005/0225867 A1 | 10/2005 | Ishibashi et al. |
| 2005/0238194 A1 | 10/2005 | Chornenky |
| 2005/0239502 A1 | 10/2005 | Swab et al. |
| 2005/0248722 A1 | 11/2005 | Nelis |
| 2005/0264502 A1 | 12/2005 | Sprague et al. |
| 2005/0275714 A1 | 12/2005 | Ishikawa et al. |
| 2005/0283263 A1 | 12/2005 | Eaton et al. |
| 2006/0009154 A1 | 1/2006 | Tung |
| 2006/0023158 A1 | 2/2006 | Howell et al. |
| 2006/0028400 A1 | 2/2006 | Lapstun et al. |
| 2006/0030360 A1 | 2/2006 | Yeh |
| 2006/0034478 A1 | 2/2006 | Davenport |
| 2006/0046656 A1 | 3/2006 | Yang |
| 2006/0046736 A1 | 3/2006 | Pering et al. |
| 2006/0072067 A1 | 4/2006 | Jannard et al. |
| 2006/0093178 A1 | 5/2006 | Chen |
| 2006/0109350 A1 | 5/2006 | Yeh |
| 2006/0132382 A1 | 6/2006 | Jannard |
| 2006/0146277 A1 | 7/2006 | Jannard et al. |
| 2006/0160573 A1 | 7/2006 | Montvay |
| 2006/0183427 A1 | 8/2006 | Warren |
| 2006/0187404 A1 | 8/2006 | Ifergan |
| 2006/0192306 A1 | 8/2006 | Giller |
| 2006/0197907 A1 | 9/2006 | Jannard et al. |
| 2006/0203183 A1 | 9/2006 | Jannard et al. |
| 2006/0203184 A1 | 9/2006 | Jannard et al. |
| 2007/0000033 A1 | 1/2007 | Dixon |
| 2007/0008484 A1 | 1/2007 | Jannard |
| 2007/0013863 A1 | 1/2007 | Zelazowski |
| 2007/0013864 A1 | 1/2007 | Dietz |
| 2007/0030442 A1 | 2/2007 | Howell et al. |
| 2007/0037520 A1 | 2/2007 | Warren |
| 2007/0046887 A1 | 3/2007 | Howell et al. |
| 2007/0064311 A1 | 3/2007 | Park |
| 2007/0081123 A1 | 4/2007 | Lewis |
| 2007/0081124 A1 | 4/2007 | Lewis |
| 2007/0081125 A1 | 4/2007 | Lewis |
| 2007/0201000 A1 | 8/2007 | Jackson et al. |
| 2007/0208531 A1 | 9/2007 | Darley et al. |
| 2007/0222940 A1 | 9/2007 | Cohen |
| 2007/0225550 A1 | 9/2007 | Gattani et al. |
| 2008/0013037 A1 | 1/2008 | Carollo |
| 2008/0055410 A1 | 3/2008 | DeKeyser |
| 2008/0058681 A1 | 3/2008 | Casali et al. |
| 2008/0089545 A1 | 4/2008 | Jannard et al. |
| 2008/0144854 A1 | 6/2008 | Abreu |
| 2008/0158506 A1 | 7/2008 | Fuziak |
| 2008/0165317 A1 | 7/2008 | Wilson |
| 2008/0169998 A1 | 7/2008 | Jacobsen et al. |
| 2008/0192114 A1 | 8/2008 | Pearson et al. |
| 2008/0198324 A1 | 8/2008 | Fuziak |
| 2008/0204589 A1 | 8/2008 | Chang |
| 2008/0239232 A1 | 10/2008 | Guerrero |
| 2008/0273084 A1 | 11/2008 | MacDougall et al. |
| 2008/0284974 A1 | 11/2008 | Siu |
| 2008/0309586 A1 | 12/2008 | Vitale |

(56) References Cited

U.S. PATENT DOCUMENTS

| | | |
|---|---|---|
| 2009/0059381 A1 | 3/2009 | Jannard |
| 2009/0066910 A1 | 3/2009 | Jannard et al. |
| 2009/0073330 A1 | 3/2009 | Viala |
| 2009/0086159 A1 | 4/2009 | Jannard |
| 2009/0122253 A1 | 5/2009 | Clay |
| 2009/0180194 A1 | 7/2009 | Yamaguchi |
| 2009/0190026 A1 | 7/2009 | Chen |
| 2009/0201460 A1 | 8/2009 | Blum et al. |
| 2009/0201466 A1 | 8/2009 | Knecht et al. |
| 2009/0251661 A1 | 10/2009 | Fuziak, Jr. |
| 2009/0307828 A1 | 12/2009 | Ludlow |
| 2010/0002186 A1 | 1/2010 | Zelman |
| 2010/0026970 A1 | 2/2010 | Tanaka |
| 2010/0110368 A1 | 5/2010 | Chaum |
| 2010/0128135 A1 | 5/2010 | Filipovich et al. |
| 2010/0177168 A1 | 7/2010 | Hu |
| 2010/0177201 A1 | 7/2010 | Filipovich et al. |
| 2010/0188489 A1 | 7/2010 | Mashitani et al. |
| 2010/0208121 A1 | 8/2010 | Kato et al. |
| 2010/0220282 A1 | 9/2010 | Moritz et al. |
| 2010/0238396 A1 | 9/2010 | Jannard |
| 2010/0253904 A1 | 10/2010 | Jannard |
| 2010/0265455 A1 | 10/2010 | Jannard et al. |
| 2010/0277563 A1 | 11/2010 | Gupta et al. |
| 2010/0309426 A1 | 12/2010 | Howell et al. |
| 2010/0309427 A1 | 12/2010 | Warren |
| 2011/0050546 A1 | 3/2011 | Swartz, Jr. et al. |
| 2011/0080555 A1 | 4/2011 | Chow |
| 2011/0085135 A1 | 4/2011 | Bertolli |
| 2011/0102733 A1 | 5/2011 | Moritz et al. |
| 2011/0170065 A1 | 7/2011 | Sugio et al. |
| 2011/0170066 A1 | 7/2011 | Sugio et al. |
| 2011/0170067 A1 | 7/2011 | Sato et al. |
| 2011/0178784 A1 | 7/2011 | Sato et al. |
| 2011/0187640 A1 | 8/2011 | Jacobsen et al. |
| 2011/0193963 A1 | 8/2011 | Hess et al. |
| 2011/0255050 A1 | 10/2011 | Jannard et al. |
| 2011/0261166 A1 | 10/2011 | Olazaran |
| 2011/0261176 A1 | 10/2011 | Monaghan, Sr. et al. |
| 2011/0273906 A1 | 11/2011 | Nichol et al. |
| 2011/0310345 A1 | 12/2011 | Warren |
| 2012/0013843 A1 | 1/2012 | Jannard |
| 2012/0069448 A1 | 3/2012 | Sugihara et al. |
| 2012/0105740 A1 | 5/2012 | Jannard et al. |
| 2012/0169854 A1 | 7/2012 | Seo et al. |
| 2012/0210489 A1 | 8/2012 | Abreu |
| 2012/0212414 A1 | 8/2012 | Ousterhout et al. |
| 2012/0220234 A1 | 8/2012 | Abreu |
| 2012/0224135 A1 | 9/2012 | Moritz et al. |
| 2013/0072828 A1 | 3/2013 | Sweis et al. |
| 2013/0091623 A1 | 4/2013 | McCulloch et al. |
| 2013/0100410 A1 | 4/2013 | Liang |
| 2013/0100534 A1 | 4/2013 | Jannard |
| 2013/0212765 A1 | 8/2013 | Cornelius |
| 2013/0214998 A1 | 8/2013 | Andes et al. |
| 2013/0235331 A1 | 9/2013 | Heinrich et al. |
| 2013/0250232 A1 | 9/2013 | Belbey et al. |
| 2013/0250233 A1 | 9/2013 | Blum et al. |
| 2013/0281166 A1 | 10/2013 | Warren |
| 2013/0293448 A1 | 11/2013 | Jannard |
| 2014/0002629 A1 | 1/2014 | Ratcliff et al. |
| 2014/0027436 A1 | 1/2014 | Cornelius |
| 2014/0033409 A1 | 2/2014 | O'Malley et al. |
| 2014/0098424 A1 | 4/2014 | Jannard |
| 2014/0104566 A1 | 4/2014 | Kokonaski et al. |
| 2014/0160424 A1 | 6/2014 | Benko et al. |
| 2014/0168784 A1 | 6/2014 | Hiraki |
| 2014/0237709 A1 | 8/2014 | McCulloch et al. |
| 2014/0253868 A1 | 9/2014 | Jannard |
| 2014/0267645 A1 | 9/2014 | Wexler et al. |
| 2014/0267648 A1 | 9/2014 | Wexler et al. |
| 2014/0268016 A1 | 9/2014 | Chow et al. |
| 2014/0268017 A1 | 9/2014 | Sweis |
| 2014/0270244 A1 | 9/2014 | Fan |
| 2014/0270316 A1 | 9/2014 | Fan |
| 2014/0290054 A1 | 10/2014 | Etzkorn |
| 2014/0293215 A1 | 10/2014 | Blum et al. |
| 2014/0303687 A1 | 10/2014 | Wall et al. |
| 2014/0317836 A1 | 10/2014 | McCulloch et al. |
| 2014/0374402 A1 | 12/2014 | Cornelius et al. |
| 2015/0053067 A1 | 2/2015 | Goldstein |
| 2015/0061837 A1 | 3/2015 | Honoré et al. |
| 2015/0062469 A1 | 3/2015 | Fleury |
| 2015/0116655 A1 | 4/2015 | Jannard |
| 2016/0004103 A1 | 1/2016 | Reyes |

FOREIGN PATENT DOCUMENTS

| | | |
|---|---|---|
| CN | 2108942 | 7/1992 |
| CN | 2583696 Y | 10/2003 |
| CN | 1687817 | 10/2005 |
| CN | 2735373 Y | 10/2005 |
| CN | 2760600 Y | 2/2006 |
| CN | 201097024 Y | 8/2008 |
| CN | 201637963 U | 11/2010 |
| CN | 202583631 U | 12/2012 |
| CN | 103207463 A | 7/2013 |
| CN | 203084359 U | 7/2013 |
| CN | 103263109 A | 8/2013 |
| CN | 103293712 A | 9/2013 |
| CN | 203204263 U | 9/2013 |
| CN | 203217195 U | 9/2013 |
| CN | 203217199 U | 9/2013 |
| CN | 203275813 U | 11/2013 |
| CN | 103957346 A | 7/2014 |
| DE | 831 747 C | 2/1952 |
| DE | 197 04 063 A1 | 2/1999 |
| DE | 299 01 673 U1 | 2/1999 |
| DE | 20 2004 004 378 | 8/2004 |
| DE | 20 2006 004 294 | 7/2006 |
| DE | 10 2005 054 317 A1 | 5/2007 |
| EP | 0 840 465 | 5/1998 |
| EP | 1 544 665 | 6/2005 |
| EP | 2 169 444 | 3/2010 |
| ES | 2 299 399 | 5/2008 |
| FR | 929 851 | 1/1948 |
| FR | 1 160 007 | 7/1958 |
| FR | 1 444 945 | 10/1966 |
| FR | 2 157 260 | 6/1973 |
| FR | 2 642 856 | 8/1990 |
| FR | 2 789 499 | 8/2000 |
| GB | 497 375 | 12/1938 |
| GB | 723 981 | 2/1955 |
| GB | 2 362 474 A | 11/2001 |
| GB | 2 401 772 A | 11/2004 |
| IT | 00235504 | 4/2000 |
| JP | 42-022998 | 11/1942 |
| JP | 58-113912 A | 7/1983 |
| JP | 58-113914 A | 7/1983 |
| JP | 62-005024 | 1/1987 |
| JP | 02-121661 A | 5/1990 |
| JP | 03-027014 A | 2/1991 |
| JP | 04-023579 A | 1/1992 |
| JP | 04-086642 A | 3/1992 |
| JP | 08-009483 A | 1/1996 |
| JP | 08-036143 | 2/1996 |
| JP | 11-353444 | 12/1999 |
| JP | 2001 170103 A | 6/2001 |
| JP | 2002-085444 | 3/2002 |
| JP | 2002 252075 A | 9/2002 |
| JP | 2003-189398 | 7/2003 |
| JP | 2005-086522 A | 3/2005 |
| JP | 2007-148131 | 6/2007 |
| JP | 2008-545287 A | 12/2008 |
| JP | 2011-180414 A | 9/2011 |
| JP | 3171527 | 10/2011 |
| WO | WO 96/23373 | 8/1996 |
| WO | WO 97/25790 | 7/1997 |
| WO | WO 97/33270 | 9/1997 |
| WO | WO 99/23524 | 5/1999 |
| WO | WO 99/50706 | 10/1999 |
| WO | WO 00/65803 | 11/2000 |
| WO | WO 00/70390 | 11/2000 |
| WO | WO 00/70779 | 11/2000 |

(56) References Cited

FOREIGN PATENT DOCUMENTS

| | | |
|---|---|---|
| WO | WO 00/79329 | 12/2000 |
| WO | WO 00/79333 | 12/2000 |
| WO | WO 01/06298 | 1/2001 |
| WO | WO 02/065198 | 8/2002 |
| WO | WO 03/067585 | 8/2003 |
| WO | WO 03/071830 | 8/2003 |
| WO | WO 2005/050288 | 6/2005 |
| WO | WO 2006/120416 | 11/2006 |
| WO | WO 2007/068808 | 6/2007 |
| WO | WO 2008/082718 | 7/2008 |
| WO | WO 2010/098902 | 9/2010 |
| WO | WO 2013/027752 | 2/2013 |
| WO | WO 2013/059257 | 4/2013 |
| WO | WO 2013/078442 | 5/2013 |
| WO | WO 2013/123262 | 8/2013 |
| WO | WO 2014/070770 | 5/2014 |
| WO | WO 2014/149631 | 9/2014 |
| WO | WO 2014/201213 | 12/2014 |
| WO | WO 2015/048564 | 4/2015 |

OTHER PUBLICATIONS

Alderton, Megan: "The Bluetooth Question", RF Design. Jan. 1, 2001.
Bluetooth Specification Version 1.1, Feb. 22, 2001, pp. 1-452.
Borriello, Gaetano: "Survey on Information Appliances", Computer Society, 2002. http://www.computer.org/cga/articles/infoappli.htm, Oct. 8, 2003.
Complaint for Patent and Tradedress Infringement; U.S. District Court—Central District of California; Case No. SA-CV-07-1184 AHS (Anx); *Oakley, Inc.* v. *Audio Visual Allstar dba AVAsunglasses. com*; Filed Oct. 4, 2007; this lawsuit is settled and dismissed.
Complaint for Patent Infringement U.S. District—Central District of California; Case No. SACV 06-899 JVS (MLGx); *Oakley, Inc.* v. *Xonix Electronics Co., Ltd.*, filed Sep. 26, 2006; this lawsuit has been dismissed.
Complaint for Patent Infringement; U.S. District—Central District of California; Case No. 03-6284 (GAF)(FMOx); *QR Spex, Inc. and Thomas G. Swab* v. *Motorola, Inc. and Frog Design, Inc.*; filed Sep. 3, 2003; this lawsuit was transferred to the Central District of California from the Eastern District of Texas and was dismissed.
Complaint for Patent Infringement; U.S. District Court—Central District of California, Southern Division; Case No. SACV 07-558 AG (RNBx); *Oakley, Inc.* v. *Practical Enterprises, Inc.*, filed May 16, 2007; this lawsuit was settled and dismissed.
Complaint for Patent Infringement; U.S. District Court—Central District of California, Southern Division; Case No. SACV 07-888 CJC (RCx); *Oakley, Inc.* v. *The Pep Boys Manny Moe & Jack of California, Inc.*, filed Aug. 1, 2007; this lawsuit is settled and dismissed.
Complaint for Patent Infringement; U.S. District Court—Central District of California; Case No. 07-CV-1153 AHS (PJWx); *Oakley, Inc.* v. *Zeal Optics, Inc.*; filed Sep. 28, 2007; this lawsuit was dismissed.
Complaint of Patent Infringement; U.S. District Court—Central District of California; Case No. SACV 09-00062 JVS (Anx); *Oakley, Inc.* v. *Spencer Gifts, LLC.*: filed Jan. 14, 2009; this lawsuit was settled and dismissed.
De Herrera, Chris: "The Future of the Pocket PC", Pocket PC Magazine, 2003. http://www.pocketpcmag.com/ Mar02/future.asp, Oct. 8, 2003.
Decision Dismissing Request to Strike Detailed Request for Reexamination, received Jun. 11, 2009 in U.S. Reexam Appl. No. 90/009,088, 5 pages.
Defendant Motorola, Inc.'s Responses to Plaintiffs' First Set of Interrogatories; U.S. District Court—Central District of California; Case No. CV 03-6284 JFW (FMOx); *QR Spex, Inc. and Thomas G. Swab* v. *Motorola, Inc. and Frog Design, Inc.*; dated Apr. 26, 2004; this lawsuit was transferred to the Central District of California from the Eastern District of Texas and was dismissed.

Defendant's Preliminary Invalidity Contentions re U.S. Pat. No. 7,331,666 and Addendum, U.S. District Court—Eastern District of Texas; Case No. 5:06CV124; U.S. District Court—Central District of California; Case No. SACV 06-627 CJC (RNBx); *QR Spex, Inc.* v. *Oakley, Inc., Oakley Sales Corp., Oakley Direct, Inc., and Motorola, Inc.*; filed Nov. 3, 2008; this lawsuit was consolidated and dismissed.
Defendants' Preliminary Invalidity Contentions re U.S. Pat. No. 6,769,767, including Exhibit, U.S. District Court—Eastern District of Texas; Case No. 5 :06CV124; U.S. District Court Central District of California; Case No. SACV 06-627 CJC (RNBx); *QR Spex, Inc.* v. *Oakley, Inc., Oakley Sales Corp., Oakley Direct, Inc., and Motorola, Inc.*; filed Jun. 16, 2008; this lawsuit is consolidated and dismissed.
Determination of Decision Granting Ex Parte Reexamination, received in U.S. Reexam Appl. No. 90/009,088, Jun. 12, 2008, 14 pages.
Determination of Decision Granting Ex Parte Reexamination, received in U.S. Reexam Appl. No. 90/009,112, Jun. 16, 2008, 14 pages.
DeVaul et al.: "The Memoray Glasses: Subliminal vs. Overt Memory Support with Imperfect Information", 2002.
DeVaul, Richard W.: "The Memory Glasses Project", MIThril Media Lab, Oct. 28, 2003. http://www.media.mit.edu/wearables/mithril/memory-glasses.html.
Dorfman, Marjorie: "Wearable Technology: La Computer Mobile", Byte Back Online, 2003. http://www.bytebackonline.com/Articles_ p/wearcomp_p.html, ct. 8, 2003.
Dresang, Joel: "Finns Fluent in Language of Cell Phones", JSOnline—Milwaukee Journal Sentinel, Apr. 15, 2000. http://www.isonline.com/bym/news/apr00/phone16041500a.asp?format=print. Accessed on Aug. 23, 2004.
Dressing in Digital Attire, Consumer Electronics Association—Vision, Nov./Dec. 2001. http://www.ce.org/publications/vision/2001/novdec/p08.asp?bc=cat&category_id=39. Dec. 5, 2003.
European Extended Search Report in co-pending PCT Application No. 07869181.3 in 4 pages, dated Apr. 10, 2012.
European Extended Search Report re EP Application No. 06734820, dated Feb. 11, 2009.
European Extended Search Report re EP Application No. 11171544.7, dated Oct. 7, 2011.
European Extended Search Report, re EPO Application No. 05851915.8, dated Mar. 23, 2011.
European Extended Search Report, re EPO Application No. 08020604.8, mailed Apr. 2, 2009.
European Office Action in co-pending PCT Application No. 07869181.3 in 4 pages, dated Dec. 7, 2012.
European Supplementary Search Report, re EP Application No. 03771935.8, dated Sep. 22, 2009.
First Amended Complaint and Application for Permanent Injunction; U.S. District Court—Eastern District of Texas (Texarkana Division); Civil Action No. 506 CV 124; *QR Spex, Inc.* v. *Motorola, Inc.; Oakley, Inc.; Oakley Sales Corp.; Oakley Direct Inc.; Zeal Optics, Inc.; Xonix Electronic Co., Ltd; and Kyocera Wireless Corp.*, filed Jul. 27, 2006; this lawsuit was transferred to the Central District of California from Eastern District of Texas and was dismissed.
First Amended Complaint for Patent Infringement; U.S. District—Central District of California; Case No. SACV 06-244 AHS (MLGx); *Oakley, Inc.* v. *Overstock.com, Inc., Wootcom, Inc. dba Synapse Micro, Inc., Global American Technologies, LLC., Aigo, Corp.*, filed Mar. 27, 2006; this lawsuit has been settled in part and dismissed.
First Amended Complaint for Patent Infringement; U.S. District Court—Central District of California; Case No. SACV 05-1099 AHS (MLGx); *Oakley, Inc.* v. *BMW of North America, LLC.*, filed Nov. 28, 2005; this lawsuit has been settled and dismissed.
First Amended Complaint for Patent Infringement; U.S. District Court—Central District of California, Southern Division; Case No. SACV 07-57 DOC (Anx); *Oakley, Inc.* v. *Blue Diamond International*, filed Jan. 16, 2007; this lawsuit resulted in a default judgment.

(56) References Cited

OTHER PUBLICATIONS

First Amended Complaint for Patent Infringement; U.S. District Court—Central District of California, Southern Division; Case No. SACV 07-671 AG (RNBx); Oakley, Inc. v. Xonix (Zhuhai) Electronics Co., Ltd. et al., filed Jun. 7, 2007; this lawsuit was settled and dismissed.
Franklin, Curt: How Bluetooth Works from www.howstuffworks.com, web site visited on Jun. 11, 2002.
Frog Design and Motorola Launch Prototypes of Next Generation of Wearable Wireless Solutions, Frog Design.com, 2003. http://www.frogdesign.com/company/news_press/press_releases/2003/pro046.html. Apr. 5, 2004.
Furan, Amy. "Computing on the Go", Techies.com, http://home.techies.com/Common/Career/2 .Nerge060 100__m.js. Oct. 8, 2003.
Hands-Free Profile (HFP), Oct. 22, 2001, 71 pages.
Hattori, James: "Bluetooth Developers Aim to Usher in a Wireless Era", CNN.com—Technology—Computing. Sep. 1, 2000. http://cnn.com.
Headset Profile from Bluetooth Specification Version 1.1, Feb. 22, 2001, pp. 198-224.
Hieb, Barry MD. "The Electronic Age: The Future of Wearables", Advance Newsmagazine-for Nurse Practitioners, Mar. 5, 2001. http://www.advancefornp.com/common/editorial/PrintFriendly.aspx?CC~2160. Mar. 17, 2004.
International Preliminary Report on Patentability received in co-pending PCT Application No. PCT/US2007/087306, mailed Jun. 25, 2009, 7 pages.
International Preliminary Report on Patentability, and Written Opinion, re PCT Application No. PCT/US2012/049212, issued Feb. 4, 2014.
International Preliminary Report on Patentability, re PCT Application No. PCT/US05/42084, mailed May 31, 2007.
International Preliminary Report, re PCT Application No. PCT/US03/23472, mailed Sep. 9, 2004, 8 pages.
International Search Report and Written Opinion re PCT Application No. PCT/US06/04860, mailed Aug. 7, 2007, in 10 pages.
International Search Report and Written Opinion received in corresponding PCT Application No. PCT/US2007/87309, mailed May 22, 2008, 9 pages.
International Search Report and Written Opinion, re PCT Application No. PCT/US2012/049212, dated Oct. 22, 2012.
International Search Report, re PCT Application No. PCT/US01/17540, mailed Oct. 26, 2001.
International Search Report, re PCT Application No. PCT/US03/23472, mailed Apr. 20, 2004.
International Search Report, re PCT Application No. PCT/US03/23472, mailed Feb. 12, 2004, 8 pages.
International Search Report, re PCT Application No. PCT/US05/42084, mailed Jan. 16, 2007.
Invisible Eyewear Micro Display, The MicroOptical Corporation, Pre-2007 publication.
Kleinman, Neil. "Wearable Wear—Wearable computing in jewelry?", Pen Computing—Covering Mobile Computing and Communications. Issue 39, May 2001. http://www.pencomputing.com/wearableware/column39.htrnl. Mar. 17, 2004.
Mann, Steve. "Wearable Computing: A First Step Toward Personal Imaging", Computer-Cybersquare, vol. 30, No. 2, Feb. 1997. http://wearcam.org/ieeecomputer/r2025.htm.
McKay, Niall. "You are What You Wear", The Feature.com, Aug. 7, 2000. http://www.thefeature.com/article?articleid=I223. Oct. 8, 2003.
Moran, John M. "Wrist Phones Step Out of the Comic Page", Chicago Tribune Online, Oct. 19, 2000. http://www.chica .. ./sns-ebiz-wireless101900wrist,0,3250718.stor. Oct. 8, 2003.
Motorola Bluetooth Wireless Headset User Guide, 2001, 27 pages.
Motorola Conosumer Catalog for Phone Accessories from www.commerce.motorola.com,web site visited on Jun. 13, 2002.
Notice of Intent to Issue Ex Parte Reexamination Certificate, received Jul. 7, 2009 in U.S. Reexam Appl No. 90/009,088, 10 pages.
Notice of Intent to Issue Ex Parte Reexamination Certificate, received Jul. 7, 2009 in U.S. Reexam Appl No. 90/009,112, 11 pages.
OEM Developer Kits—DV-1 Wireless Digital Viewer, The MicroOptical Corporation—Making Portable Practical 2004. http://www.microopticalcorp.com/OEM/kitDV-1.html. Accessed on Apr. 20, 2004.
Office Action (Petition Decision Denying Request to Vacate as Non-Compliant) received in U.S. Reexam Appl. No. 90/009,088, mailed Mar. 11, 2009, 16 pages.
Office Action (Petition Decision Denying Request to Vacate as Non-Compliant) received in U.S. Reexam Appl. No. 90/009,112, mailed Mar. 11, 2009, 26 pages.
Patent Owner's Statement under 37 CFR. § 1.530, filed in U.S. Reexam Appl. No. 90/009,088, Aug. 12, 2008, 4 pages.
Patent Owner's Statement under 37 CFR. § 1.530, filed in U.S. Reexam Appl. No. 90/009,112, Aug. 13, 2008, 5 pages.
Pentland, Alex Sandy. "Wearable Information Devices", MIT Media Laboratory, pp. 12-67, 2001.
Petition Decision Denying Request to Vacate as Non-Compliant [37 CFR 1.181(a)&C], received in U.S. Reexam Appl. No. 90/009,112, Mar. 11, 2009, 5 pages.
Petition Decision Denying Request to Vacate as Non-Compliant [37 CFR 1.181(a)&C], received in US Reexam Appl. No. 90/009,088, Jun. 11, 2009, 5 pages.
Petition under 37 CFR. 1.182 to Strike Detailed Request for Reexamination due to Non-Compliance with at Least MPEP 2205, filed in U.S. Reexam Appl. No. 90/009,088, Aug. 12, 2008, 4 pages.
Petition under 37 CFR. 1.182 to Strike Detailed Request for Reexamination due to Non-Compliance with at Least MPEP 2205, filed in U.S. Reexam Appl. No. 90/009,112, Aug. 13, 2008, 4 pages.
Piller, Charles. "Internet Guru's Theory of Evolution", LA Times.com, Apr. 3, 2000. http://latimes.com/print/business/20000403/t000031121.html, Oct. 8, 2003.
Piller, Charles: "Connecting the World through Internet Applicances", Patrickweb.com, Apr. 9, 2000, http://www.patrickweb.com/pages/int /appliances_iws2000.htrn. Oct. 8, 2003.
Plaintiffs' Response to Defendant Motorola, Inc.'s First Set of Request for Admission; U.S. District Court—Central District of California; Case No. CV 03-6284 JFW (FMOx); QR Spex, Inc. and Thomas G. Swab v. Motorola, Inc. and Frog Design, Inc.; dated Mar. 12, 2004; this lawsuit was transferred to the Central District of California from the Eastern District of Texas and was dismissed.
Plaintiffs' Response to Defendant Motorola, Inc.'s First Set of Special Interrogatories; U.S. District Court—Central District of California; Case No. CV 03-6284 JFW (FMOx); QR Spex, Inc. and Thomas G. Swab v. Motorola, Inc. and Frog Design, Inc.; dated Mar. 12, 2004; this lawsuit was transferred to the Central District of California from the Eastern District of Texas and was dismissed.
Plaintiffs' Supplemental Response to Defendant Motorola, Inc.'s First Set of Interrogatories; U.S. District Court—Central District of California; Case No. CV 03-6284 JFW (FMOx); QR Spex, Inc. and Thomas G. Swab v. Motorola, Inc. and Frog Design, Inc.; dated May 18, 2004; this lawsuit was transferred to the Central District of California from the Eastern District of Texas and was dismissed.
Receipt of Original Ex Parte Request by Third Party, Filed in U.S. Reexam Appl. No. 90/009,088, Mar. 20, 2008, 60 pages.
Receipt of Original Ex Parte Request by Third Party, Filed in U.S. Reexam Appl. No. 90/009,112, Apr. 16, 2008, 75 pages.
Reexam Litigation Search conducted in U.S. Reexam Appl. No. 90/009,112, Jul. 1, 2009, 19 pages.
Reexam Litigation Search conducted in U.S. Reexam Appl. No. 90/009,112, Jun. 9, 2008, 14 pages.
Reexam Litigation Search conducted in U.S. Reexam Appl. No. 90/009,112, Mar. 4, 2009, 14 pages.
Reexam Litigation Search conducted in U.S. Reexam Appl. No. 90/099,088, Apr. 9, 2008, 30 pages.
Reexam Litigation Search conducted in U.S. Reexam Appl. No. 90/099,088, Jun. 30, 2009, 19 pages.
Reexam Litigation Search conducted in U.S. Reexam Appl. No. 90/099,088, Mar. 4, 2009, 11 pages.
Reply Memorandum of Points and Authorities in Support of Defendant Motorola, Inc.'s Motion for Summary Judgment; U.S. District

(56) References Cited

OTHER PUBLICATIONS

Court—Central District of California; Case No. CV 03-6284 JFW (FMOx); *QR Spex, Inc. and Thomas G. Swab* v. *Motorola, Inc. and Frog Design, Inc.*; filed Jun. 7, 2004; this lawsuit was transferred to the Central District of California from the Eastern District of Texas and was dismissed.
Robbins, Alexandra. "A Display in Your Glasses", PC Magazine—The Independent Guide to Technology. Nov. 12, 2002. http://www.pcmag.com/article2/0,4149,667638,00.asp. Accessed on Dec. 5, 2003.
See What You're Missing—Electronic Images/data are Superimposed Over Your View of the World, Advertisements. The MicroOptical Corporation, Pre-1999 Publication.
Shivers, Olin. "BodyTalk and the BodyNet: A Personal Information Infrastructure", Massachusetts Institute of Technology, Laboratory for Computer Science-Personal Information Architecture Note 1, Dec. 1, 1993.
Special Product Review "ID Magazine", Aug. 2002, p. 179.
Spitzer, Mark B. "The Wristwatch: the bellwether for personal technology", Technology Reports.net, Mar. 26, 2003, http://technologyreports.netlnextinnovatorl?articleID=1636. Accessed on Oct. 8, 2003.
Stevens, Cindy Loftier. "A Glimpse into the Digital Future", Consumer Electronics, Mar./Apr. 2000, http://www.ce.org/publications/vision.. .lpg21.asp?category id=3. Accessed on Oct. 8, 2003.
Stipulation and Amend Pleadings in Consolidated Cases Transferred from Eastern District of Texas; U.S. District Court—Central District of California, Southern Division; Case No. 07-CV-00987 CJC (RNBx); *QR Spex, Inc.* v. *Motorola, Inc. et al.*; filed Sep. 5, 2007; this lawsuit was transferred to the Central District of California from the Eastern District of Texas and was dismissed.
Substance and Style, by Motorola and Frog Design, Motorola. Time Nov. 17, 2003.
Summons for Complaint for Patent Infringement; U.S. District Court—Central District of California; Case No. CV-09-624 CAS (JWJx); *Oakley, Inc.* v. *Digitalrise, LLC.*; filed Jan. 27, 2009; a default judgment was ordered.
The Ultimate Device, Accenture, Nov. 7, 2000. http://www.accenture.com/xd.asp?it=enWeb &xd=Services%5CTechnology%Ctech_ultimate.html. Accessed on Oct. 8, 2003.
Theil, Stefan. "Love Those Wearables!", Newsweek, Apr. 9, 2001. http://nl.newsbank.com/nl-search/we/Archives?p_action~doc&p_docid=0EC05F8D8A26. Apr. 15, 2004.
Turoff. "Wearable Computers", Fall 1999 Semester, Course CIS732, Dec. 16, 1999. http://eies.njit.edu/-turoff/coursenotes/CIS732/sa. . /brian_732.html. Oct. 8, 2003.
UDRI Researchers Develop Glasses-mounted Display, Next Generation of Wearable Computers, University of Dayton. Feb. 29, 2000. http://www.udayton.edu/news/nr/022900a.html. Accessed on Dec. 5, 2003.
Video glasses come close to melding fantasy, reality, USA Today—Marketplace. http://www.usatoday.corn/tech/news/techinnovations/2002-09-23-glasses_x.htm. Accessed on Dec. 5, 2003.
Wave Report, The Wave Report on Digital Media, Nov. 20, 2000. http://www.wave-report.com/2000%20Wave%20Issues/wave2055.htm, Accessed on Mar. 17, 2004.
Wearable Computing, Georgia Institute of Technology, 2003. http://www.gatech.edu/innovations/wearablecomputing. Oct. 8, 2003.
Weiss, Peter. "Minding Your Business", Science News Online, Week of May 3, 2003,vol. 16. http://www.sciencenews.org/20030503/bob8.asp. Accessed on Oct. 8, 2003.
Willett, Edward. "Best of Popular Science's What's New: 1999", Edward Willett's Science Columns, 1999. http://www.edwardwillett.com/Columns/popscienceawards99.htm. Accessed on Oct. 8, 2003.
European Examination Report, re EP Application No. 06 734 820.1, dated May 13, 2014.
"Fashionable Eyewear Charms to add Color, Style & Fun to Eyeglass Frams", Ficklets—Eyewear Charm Huggers. http://www.ficklets.com. Jul. 22, 2009.
International Search Report and Written Opinion, re PCT Application No. PCT/US2010/021044, issued Apr. 13, 2010 in 16 pages.

\* cited by examiner

EYEGLASSES WITH ELECTRONIC COMPONENTS

CROSS-REFERENCE TO RELATED APPLICATIONS

The present application is a continuation of U.S. application Ser. No. 13/923,133, filed Jun. 20, 2013, which is a continuation of U.S. application Ser. No. 13/220,517, filed Aug. 29, 2011, now U.S. Pat. No. 8,473,004, which is a continuation of U.S. application Ser. No. 12/859,162, filed Aug. 18, 2010, now U.S. Pat. No. 8,010,156, which is a continuation of U.S. application Ser. No. 11/418,154, filed May 3, 2006, abandoned, which is a continuation of U.S. application Ser. No. 11/371,692, filed Mar. 9, 2006, now U.S. Pat. No. 7,231,038, which is a continuation of U.S. application Ser. No. 09/888,280, filed Jun. 21, 2001, now U.S. Pat. No. 7,013,009, which are all incorporated by reference herein.

BACKGROUND OF THE INVENTION

1. Field of the Invention

This invention relates to wearable audio communication devices and, more particularly, to eyeglasses with wireless audio communication features for remote use of a cell phone or other electronic device.

2. Description of the Related Art

Technological advances in the telecommunications and computer-related industries have provided cell phones, web phones, personal digital assistants (PDA's), hand held computers, lap tops, and other portable devices that allow for instant communication and access to information. These portable devices provide the benefit of allowing people to be connected wherever they are. A drawback to the use of cell phones, however, is that speaking on a cell phone can be a disturbance to bystanders. This is especially the case in public and other places where others generally do not want to be disturbed, such as restaurants, theaters, churches, and so forth. Similarly, using PDA's, laptops, etc. with capabilities for voice recognition and/or accessing and playing music or other audio can be an annoyance to others. Additionally, holding a cell phone to one's head while driving an automobile can be unsafe because the driver has only one hand available to operate the vehicle. Furthermore, holding a cell phone can be difficult or at least a distraction in many other situations, such as while typing on a keyboard, walking down a street or in a mall with one's hands full, while riding a bike, and so forth.

In order to provide an easier, safer, and quieter way to speak on a cell phone, there have been developed hands-free headsets with microphones and speakers connected by wires or wirelessly to a phone. These headsets enable the wearer to park their cell phone on their belt or elsewhere, and to have a conversation on their cell phone by speaking and listening via the headset. However, such headsets are typically donned and removed each time the cell phone is used, which can be a significant inconvenience. Also, such headsets must be stored somewhere when they are removed and not in use, making it more likely that the user will forget them, break them, or be further inconvenienced by carrying a case for them.

Accordingly, there remains a need in the art for a wearable audio communication device for remote use of a cell phone or other electronic device, that permits the user to easily, safely, and quietly communicate using the cell phone while engaged in another activity, without the user having to hold the cell phone in his hand, and without the inconvenience of carrying around an extra headset device, donning the headset to make or receive a call, and removing and storing the headset afterward.

SUMMARY OF THE INVENTION

The present invention fulfills these and other needs by providing wearable communications devices for sending and receiving signals wirelessly to and from a remote cell phone or other electronic device. Generally described, the invention comprises an eyeglasses device having an eyeglasses frame and having a microphone, a transmitter, a speaker, a receiver, and a power source connected together and mounted to the frame. Whenever a user has on the eyeglasses, he can converse over the cell phone privately, easily, and in a hands-free manner. Particularly for people who wear prescription glasses, the invention provides a great convenience, as they will often or most always be wearing their glasses. Thus, users can have private, hand-free conversations on their cell phones, without having to put on a headset, and afterward remove, store, and carry the headset.

In an exemplary embodiment of the invention, the eyeglasses frame has a lens holder and two support arms, and the microphone is directional and coupled to the lens holder (or one of the support arms) and oriented toward a user's mouth. The transmitter communicates by wires or otherwise with the microphone, and sends signals wirelessly (such as by radio frequency) to the cell phone. One (or more) speakers are coupled to one (or more) of the support arms and positioned adjacent to the user's ear. The receiver communicates by wires or otherwise with the speaker, and receives signals from the cell phone. The power source is electrically connected to the transmitter and to the receiver for providing the power needed to operate them.

Alternative embodiments additionally have pivotal, telescopic, and/or other extension arms for the microphone and/or the speaker. These embodiments allow the microphone and/or speaker to be extended, pivoted, or otherwise moved to a position for ease of use, and then retracted, pivoted, or otherwise moved to a stored position out of the way when not in use.

Additional alternative embodiments provide wearable communication devices with a clip-on member (instead of an eyeglasses frame) that mounts to a pair of conventional eyeglasses. Similar to the above embodiments, these have a microphone, a transmitter, a receiver, a speaker, and a power source, all mounted to the clip-on member. These embodiments permit retrofitting the wearable device onto a user's current glasses so that it is not necessary to go out a buy a new pair of glasses. Also, the user can easily change the wearable device from one pair of glasses to another.

In one of these embodiments, the clip-on member comprises a conventional clip-on lens holder of the type that is commonly used for clipping tinted sunglasses lenses onto regular prescription glass frames. In other of these embodiments, the clip-on member comprises a frame or sheet with a clip for removably mounting to the support arm of the eyeglasses frame. The microphone and speaker can be mounted directly onto the clip-on member in a spaced apart arrangement, or they can be mounted on extension arms that can be extended, pivoted, or otherwise moved to a position for use, and then moved to a stored position when not in use.

Further alternative embodiments provide wearable communication devices with a frame in the form of a hat, headband, earmuffs, or another article that can be worn on a user's head. Similar to the above embodiments, these have a microphone, a transmitter, a receiver, a speaker, and a power source, all mounted to the frame. These embodiments provided similar benefits, for instance, a user can wear a hat and use the communications features to conveniently and privately communicate on his or her cell phone.

The specific techniques and structures employed by the invention to improve over the drawbacks of the prior systems and accomplish the advantages described above will become apparent from the following detailed description of the embodiments of the invention and the appended drawings and claims.

DETAILED DESCRIPTION OF THE PREFERRED EMBODIMENT

Figure 1:
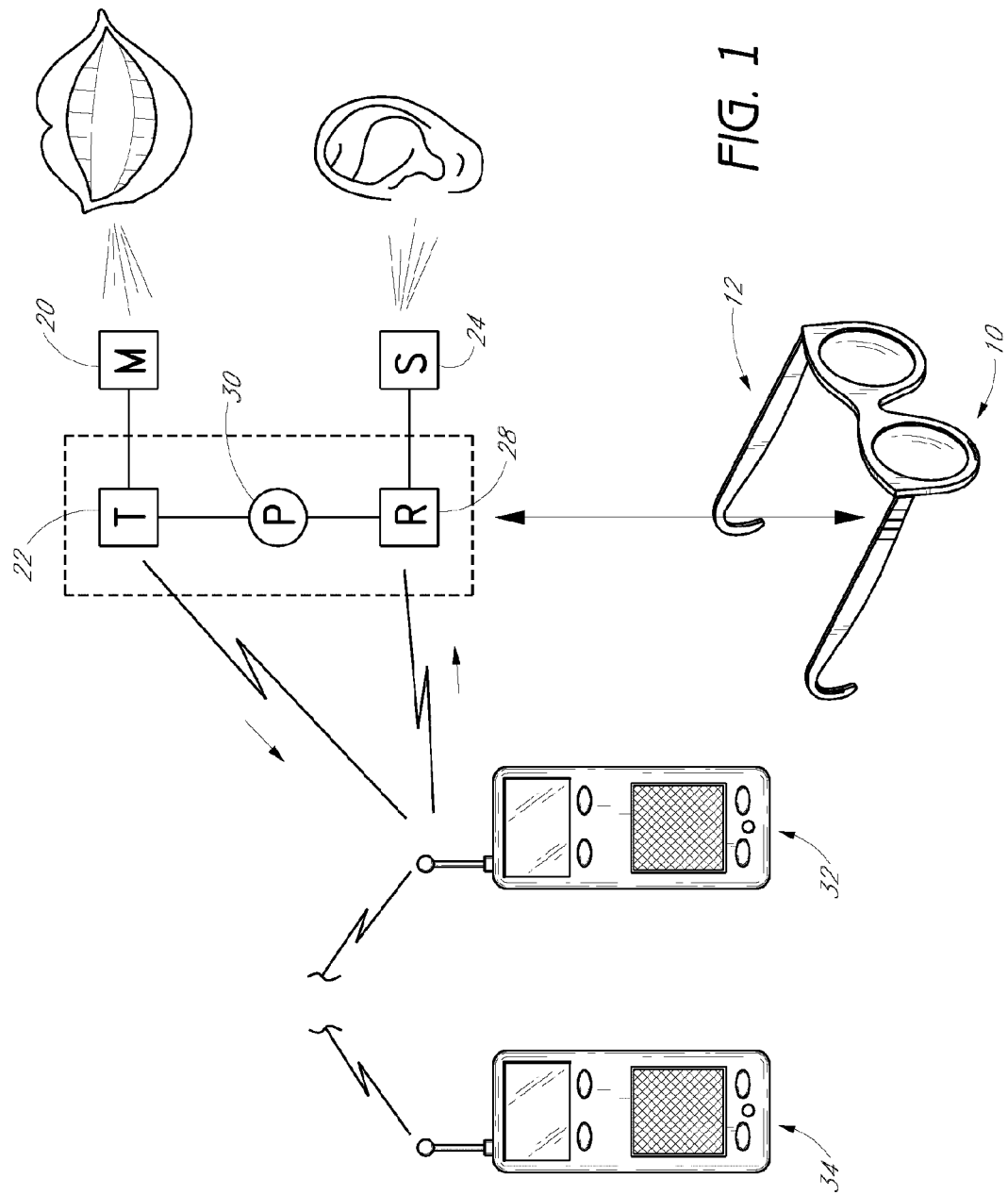
FIG. 1 is a schematic diagram of an exemplary embodiment of the eyeglasses of the present invention in use with a cell phone.

The present invention may be embodied in eyeglasses with communication features for sending and receiving signals wirelessly to and from an electronic device such as a cell phone. FIG. 1 shows one such embodiment, referred to as the eyeglasses 10, in use with a cell phone 32. The eyeglasses 10 have a microphone 20, a transmitter 22, a speaker 24, a receiver 28, and a power source 30, all mounted onto an eyeglasses frame 12. The microphone 20 receives sound from the user's mouth (or from the user clapping or otherwise making a sound) and converts the sound into a signal representing the sound, and the transmitter 22 sends the signal to the cell phone 32. The cell phone 32 in turn transmits the signal to another cell phone 34 or other electronic device. Similarly, the receiver 28 receives a signal representing a sound from the other cell phone 34, and sends the signal to the speaker 24. The speaker 28 then converts the signal to an audible sound to be heard by one or both of the user's ears.

Thus, the user can converse over the cell phone 32 privately, easily, and in a hands-free manner whenever he has on the eyeglasses 10. For example, the eyeglasses 10 can have prescription lenses, and for a person that wears his glasses much of the time, the communication features of the eyeglasses 10 will be readily available for use much of the time. Thus, the user can simply put on his eyeglasses 10 in the morning and take them off at night, as he normally does with his regular glasses, and wear his cell phone 32 on his belt, carry it in a purse or bag, or otherwise carry the cell phone remotely from the eyeglasses 10. In this manner, the user can converse on his cell phone 32 anytime and anywhere, privately, without disturbing bystanders.

Also, when wearing the eyeglasses 10, the user need not don and remove a headset every time he makes or receives a call, and need not store and carry the headset in a case or the like. Additionally, because the eyeglasses 10 provide for hands-free communication over the cell phone 32, the user can simultaneously converse on the cell phone 32 while engaging in another activity such as typing on a keyboard, driving, biking, mowing the lawn, eating, etc. Of course, the eyeglasses 10 can be alternatively provided as sun glasses or mere fashion glasses (with zero power lenses), to provide the convenience of the readily available communication features described above.

Figure 12:
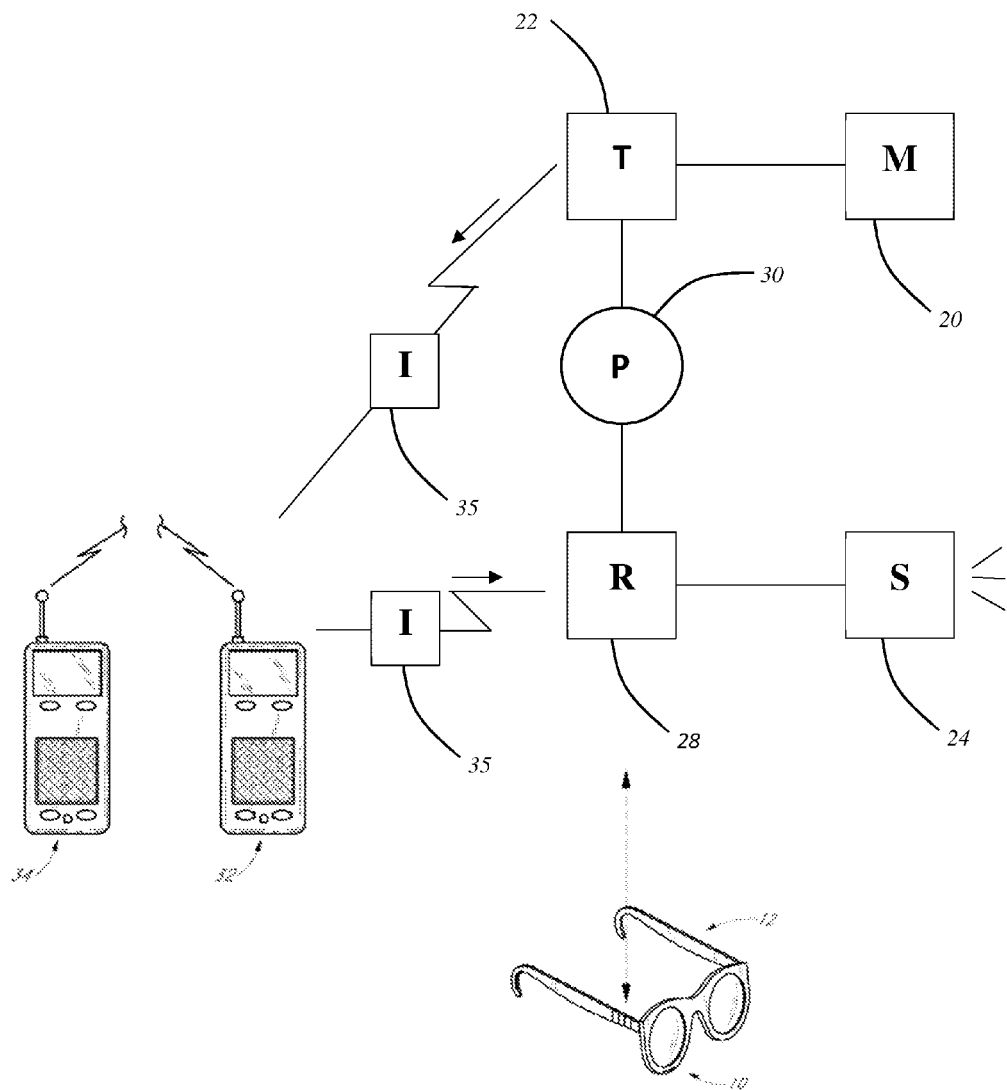
FIG. 12 is a schematic diagram of an exemplary embodiment of the eyeglasses of the present invention in use with a cell phone.

It will be understood that the cell phone 32 may need to be adapted for sending and receiving signals wirelessly to and from the eyeglasses 10. Such adaptations are known in the art, and can be readily made to provide a cell phone or other electronic device that cooperatively functions with the eyeglasses 10 as described herein. Also, the eyeglasses 10 and the cell phone 32 can be adapted for sending and receiving visual images 35, as illustrated in FIG. 12, to and from each other, and/or for sending and receiving data in other forms. Additionally, the eyeglasses 10 and/or the cell phone 32 can include encryption software providing for secure transmissions to and/or from each other. Furthermore, the eyeglasses 10 also can be used to communicate with web phones, conventional land line phones, PDA's, laptops, hand held computers, personal computers, household appliances, portable or stationary televisions, portable or stationary radios, compact disc players, tape players, or the like, and/or other electronic devices with capabilities for voice recognition and/or for accessing and playing music or other sounds.

Figure 2:
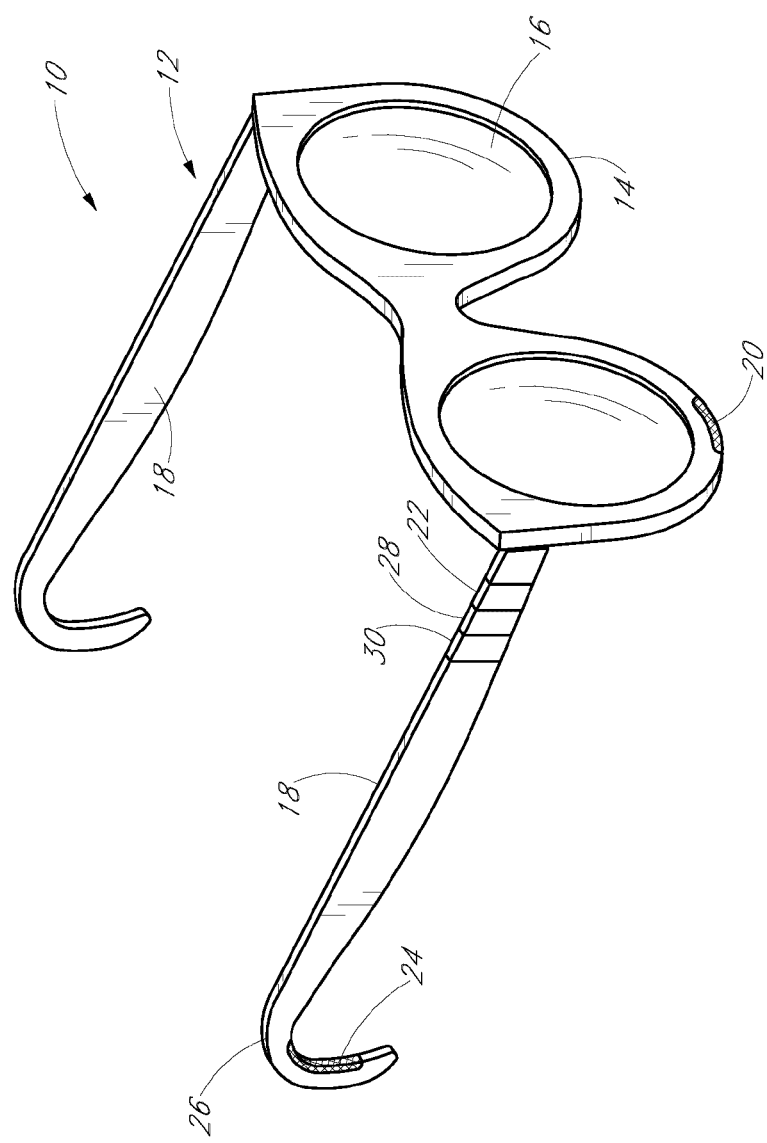
FIG. 2 is a perspective view of the exemplary embodiment of FIG. 1, showing an eyeglasses frame with a microphone and a speaker.

FIG. 2 shows an exemplary embodiment of the eyeglasses 10 of the present invention, with the eyeglasses frame 12 comprising a lens holder 14 with lenses 16, and two support arms 18 that extend over and are supported by a user's ears. The eyeglasses frame 12 can be provided by conventional eyeglass frames made of metal, plastic, or another material, having any of a variety of shapes, as is well known in the art. The lenses 16 can be provided by prescription lenses, tinted sunglasses lenses, a combination thereof, or zero power lenses, or no lenses can be provided, as may be desired. While the eyeglasses 10 are typically provided with two lenses and two support arms, it will be understood that the eyeglasses alternatively can be provided by a monocle.

The microphone 20 is mounted to the eyeglasses frame 12 for receiving sounds from the user's mouth to be transmitted to the cell phone. The microphone 20 can be provided by a conventional miniature microphone that is embedded into the frame 12. Also, the microphone 20 can be oriented toward the user's mouth and can be directional so that it picks up the user's voice when wearing the eyeglasses 10, but does not pick up as much ambient sound. Although one microphone 20 is shown mounted to the lens holder 14, alternatively, it can be mounted to the one of the support arms 18, and/or two or another number of microphones can be provided. Thus, the eyeglasses 10 can be provided with two directional microphones, each oriented toward user's mouth when wearing the eyeglasses, and each positioned on a lower portion of one of the two loops forming the lens holder 14. Also, a sensitivity control can be provided for adjusting the level of sound that the microphone 20 picks up.

The transmitter 22 is mounted to the eyeglasses frame 12 and communicates with the microphone 20 by wire, optic fiber, wirelessly, or otherwise. The transmitter 22 can be of a conventional miniature type that is configured to send signals to the cell phone. For example, the transmitter 22 can be configured with BLUETOOTH or other software for wireless transmission of radio signals or another frequency audio or other signals to the cell phone.

The speaker 24 is mounted to the eyeglasses frame 12 for playing sounds to be heard by the user's ear. The speaker 24 can be provided by a conventional miniature speaker that is embedded into the frame 12. Also, the speaker 24 can be oriented toward the user's ear and can be directional so that it plays sounds toward the user's ear but does not play sounds that can be easily heard by bystanders. For example, the speaker 24 can be a conventional miniature bone-type speaker that is mounted on an ear rest 26 of one of the support arms 18 generally adjacent to the user's ear when wearing the eyeglasses 10. Although one speaker 24 is shown mounted to the ear rest 26, alternatively, it can be mounted to another portion of one of the support arms 18 or to the lens holder 14. Also, two or another number of speakers can be provided for producing stereo, quadraphonic, or other sound. Also, a volume control can be provided for adjusting the level of sound that the speaker 24 plays.

The receiver 28 is mounted to the eyeglasses frame 12 and communicates with the speaker 24 by wire, optic fiber, wirelessly, or otherwise. The receiver 28 can be of a conventional miniature type that is configured to receive signals from the cell phone. For example, the receiver 28 can be configured with BLUETOOTH or other software for wireless reception of radio signals or another frequency audio or other signals from the cell phone.

The power source 30 is mounted to the eyeglasses frame 12 and electrically connected by a wire to the transmitter 22 and the receiver 28. The power source 30 provides the power to operate the transmitter 22 and the receiver 28. For example, the power source 30 can be provided by one or another number of batteries that screw into a receptacle in the frame 12. Alternatively, other portable power sources can be used, such as conventional batteries, photovoltaic cells, combinations thereof, and so forth. Controls can be provided for automatically shutting off the device after a predetermined period of time and automatically turning on the device upon reception of a signal from the cell phone, and a manual on/off switch and/or a low power indicator can be provided.

It will be understood by those skilled in the art that the transmitter 22, receiver 28, and power source 30 can be selected to provide low power, short range signals, so as not to interfere with signals to and from other devices in the vicinity of the user. However, these components are also selected to provide signals strong enough for transmission and reception between the eyeglasses 10 on the user's head and the cell phone 32 disposed remotely from the eyeglasses, such as on the user's belt, carrying bag or purse, etc. Also, the transmitter 22 and the receiver 28 can have optics for receiving infrared signals, instead of or in addition to radio frequency signals.

Additionally, the transmitter 22, receiver 28, and/or battery 30 can be provided as separate components or as a single component with a single antenna, mounted to the eyeglasses frame 12 at another position selected for ease of manufacturing. Also, the wires connecting the microphone 20 to the transmitter 22, the receiver 28 to the speaker 24, and/or the battery 30 to the transmitter 22 and the receiver 28, can be embedded into or mounted onto the frame 12. Furthermore, the microphone 20, transmitter 22, receiver 28, speaker 24, and/or battery 30 can be provided as a retrofit kit, with each component having clips for mounting onto a conventional eyeglasses frame, with the wires not integral to but instead routable along the frame. Additionally or alternatively, one or more wires with connectors can be provided that connect the eyeglasses and the cell phone, as may be desired.

Figure 3:
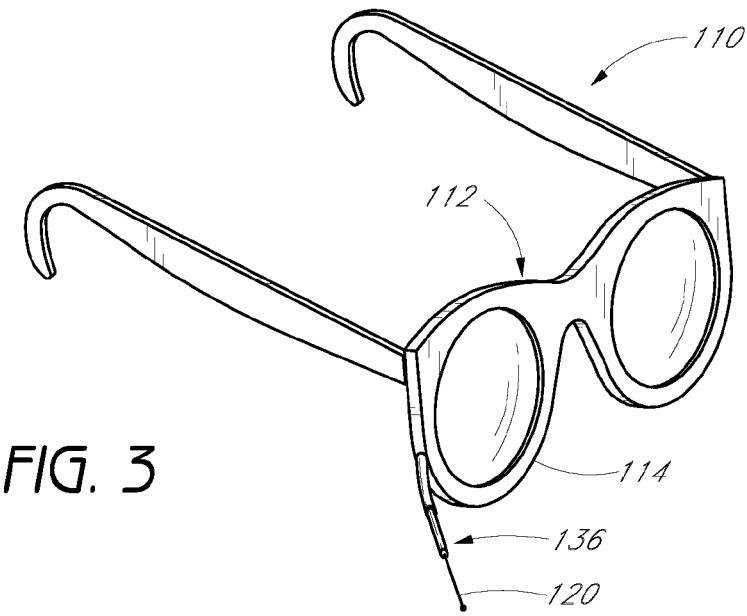
FIG. 3 is a perspective detail view of a first alternative embodiment of the present invention, showing the microphone on a telescopic arm.
Figure 4:
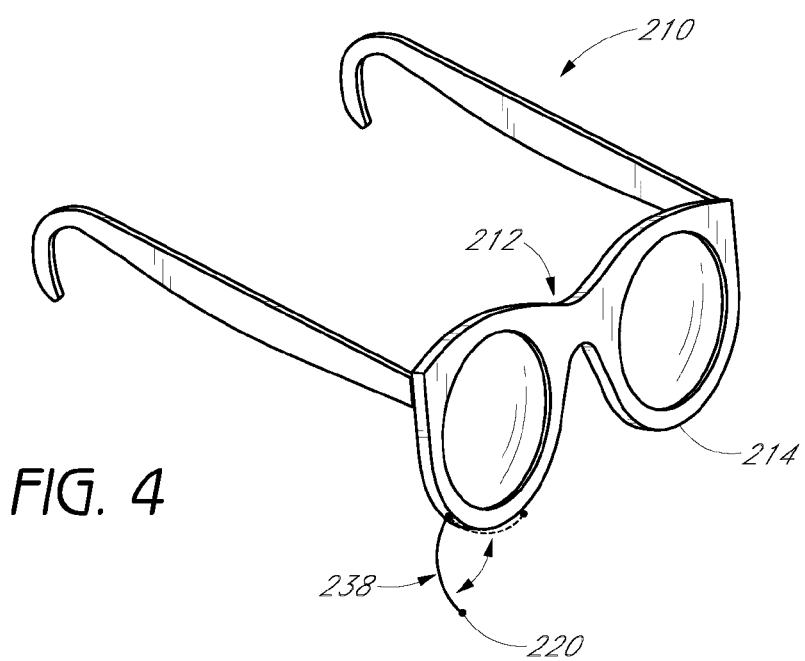
FIG. 4 is a perspective detail view of a second alternative embodiment, showing the microphone on a pivotal arm coupled to a lens holder.
Figure 5:
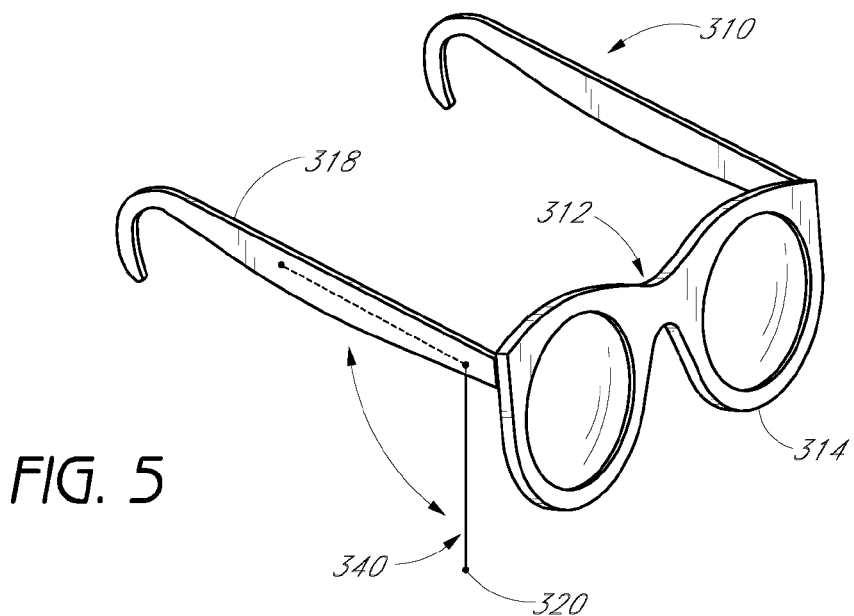
FIG. 5 is a perspective detail view of a third alternative embodiment, showing the microphone on a pivotal arm coupled to a support arm.

FIG. 3 shows a first alternative embodiment 110 of the present invention, with the microphone 120 attached to a telescopic extension arm 136 that retracts into the lens holder 114 or another part of the eyeglasses frame 112. FIG. 4 shows a second alternative embodiment 210, with the microphone 220 attached to a pivotal extension arm 238 that is pivotally connected to the lens holder 214. Such an extension arm 238 can be curved to conform to the shape of the lens holder 214. FIG. 5 shows a third alternative embodiment 310, with the microphone 320 attached to a pivotal extension arm 340 that is pivotally connected to the corresponding support arm 318. Such an extension arm 340 can be generally linear to conform to the shape of the corresponding support arm 318.

In these alternative embodiments, the microphone can be extended, pivoted, or otherwise moved into a first position when needed for use, and retracted, pivoted, or otherwise moved to a second non-obtrusive position when not needed. Also, the extension arm can be generally rigid or flexible, with or without a telescopic, pivotal, or other connection to the eyeglasses frame, as may be desired.

Figure 6:
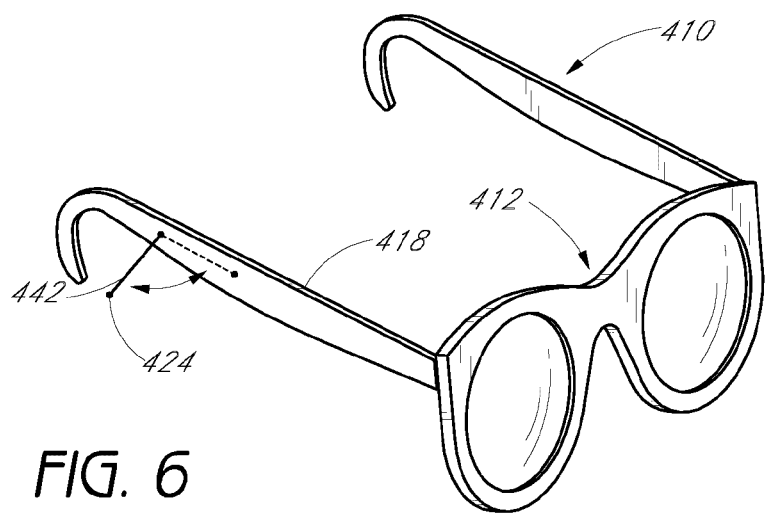
FIG. 6 is a perspective detail view of a fourth alternative embodiment, showing the speaker on a pivotal arm coupled to the support arm.

FIG. 6 shows a fourth alternative embodiment 410 of the present invention, with the speaker 424 attached to a pivotal extension arm 442 that is pivotally connected to one of the support arms 418. Of course, the extension arm can be telescopic, generally rigid, or generally flexible, as may be desired. In this alternative embodiment, the speaker 424 can be extended, pivoted, or otherwise moved into a first position when needed for use, and retracted, pivoted, or otherwise moved to a second non-obtrusive position when not needed.

Figure 7:
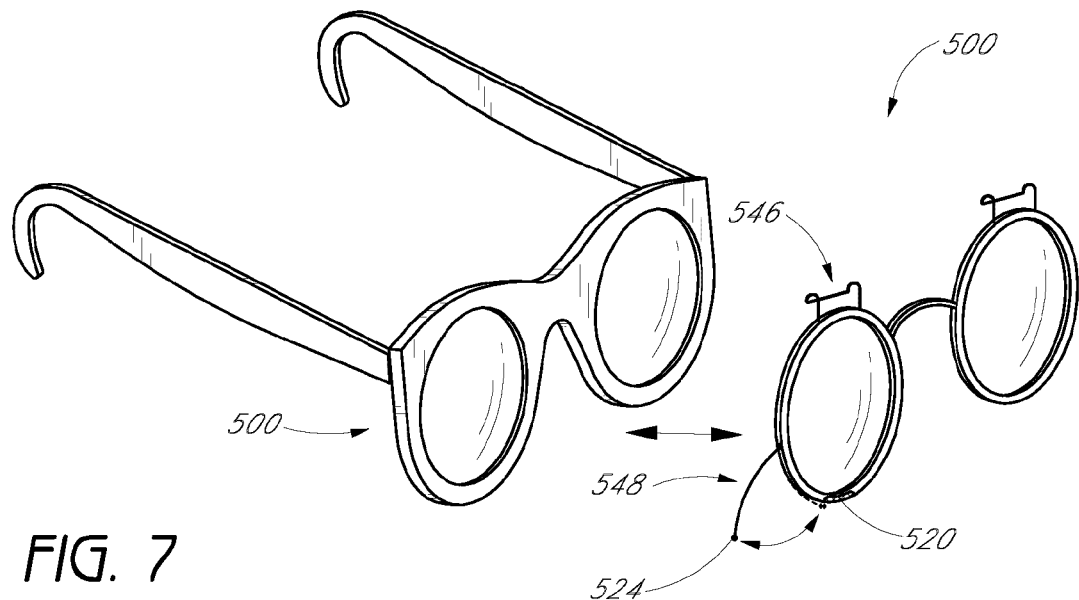
FIG. 7 is a perspective view of a fifth alternative embodiment, showing a clip-on lens holder with a microphone and a speaker.
Figure 8:
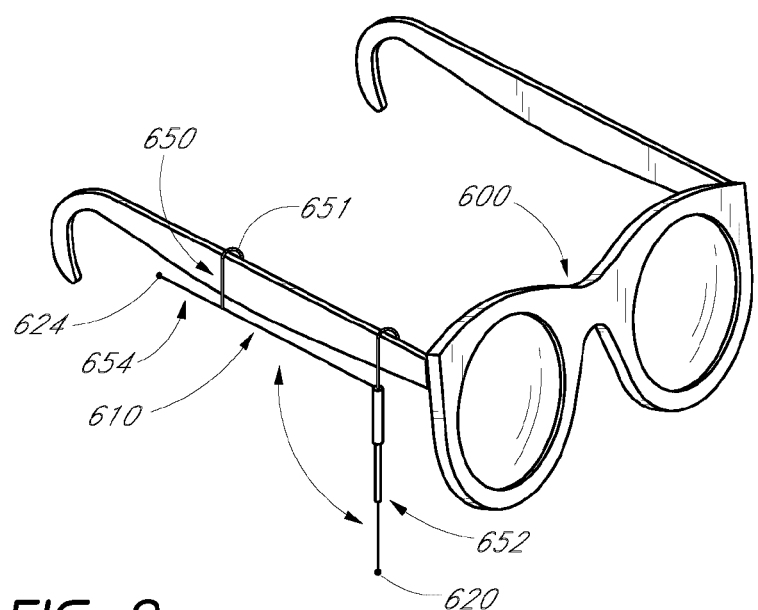
FIG. 8 is a perspective view of a sixth alternative embodiment, showing a clip-on frame member with a microphone and a speaker attached to the frame member.
Figure 9:
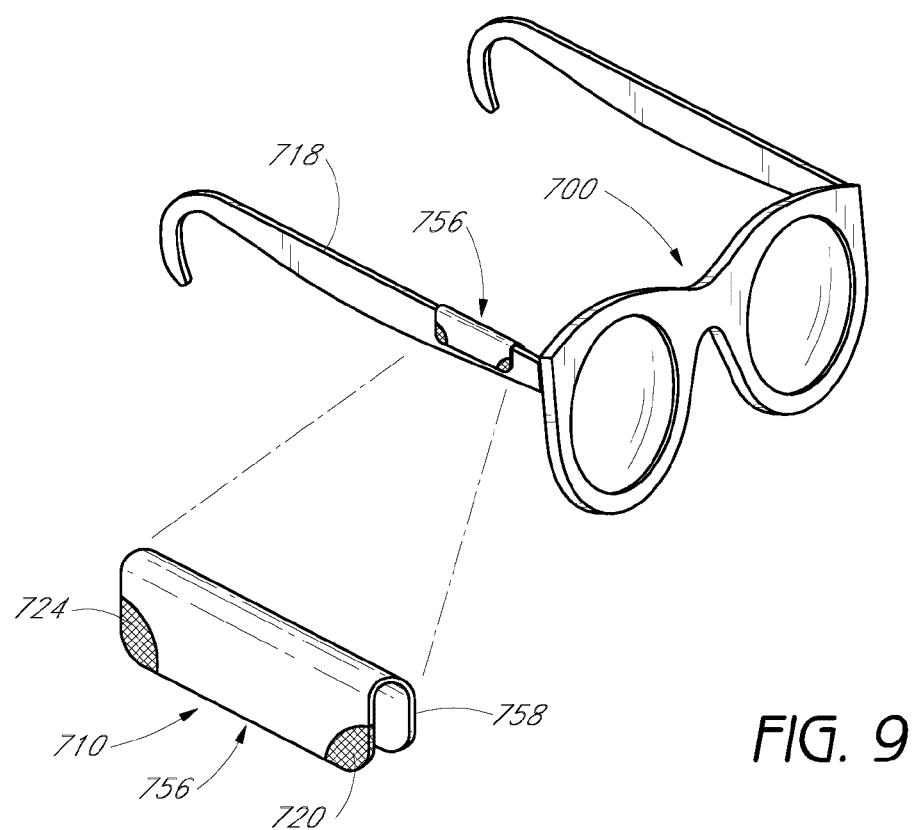
FIG. 9 is a perspective view of a seventh alternative embodiment, showing a clip-on sheet member with a built-in microphone and a built-in speaker.

FIGS. 7-9 show additional alternative embodiments of the present invention. In these embodiments, instead of the communication components being mounted directly to the eyeglasses, there is provided an attachment member having at least one connector that permits removably mounting the member onto a conventional eyeglasses frame. The connector is provided by a clip, though another mounting structure can be used as desired, such as a hook, snap, screw, or slide. The communication components (including the transmitter, the receiver, and the power source) are mounted to the clip-on member so that they can be readily utilized when the clip-on member is mounted to the user's glasses. Accordingly, the user can selectively mount the clip-on member on different pairs of glasses, as may be desired where the user has separate prescription and sun glasses, has multiple glasses that she wears depending on the mood and the occasion, purchases new eyeglasses, etc.

For example, FIG. 7 shows a fifth alternative embodiment 510 with the attachment member provided by a conventional clip-on lens holder 544 and the connector provided by two (or another number) of clips 546 for mounting onto the lens holder of a conventional eyeglasses frame 500. The microphone 520 and the speaker 524 are mounted to the lens holder 544. The speaker 524 is connected to the lens holder 544 by a pivotal extension arm 548 or by another extension arm, and the microphone can be embedded or otherwise attached to the clip-on lens holder.

FIG. 8 shows a sixth alternative embodiment 610 with the attachment member provided by a frame 650 and the connector provided by a clip 651 formed by a bent section of the frame 650, for mounting onto one of the support arms of a conventional eyeglasses frame 600. The microphone 620 and the speaker 624 are attached to the clip frame 650, with the microphone 620 attached by a pivotal and/or telescopic extension arm 652 or other extension arm, and the speaker 624 attached by a pivotal extension arm 654 or other extension arm.

FIG. 9 shows a seventh alternative embodiment 710 with the attachment member provided by a sheet 756 and the connector provided by a clip 758 formed by a bent section of the sheet 756 for mounting onto one of the support arms of a conventional eyeglasses frame. The microphone 720 and the speaker 724 are built into the sheet 756 at spaced apart positions, and are directional and oriented towards the user's mouth and ear, respectively, when wearing the clip-on attachment member on glasses. Of course, the devices of the sixth and seventh alternative embodiments could be used with devices other than eyeglasses, such as hats, visors, headbands, and so forth.

Figure 10:
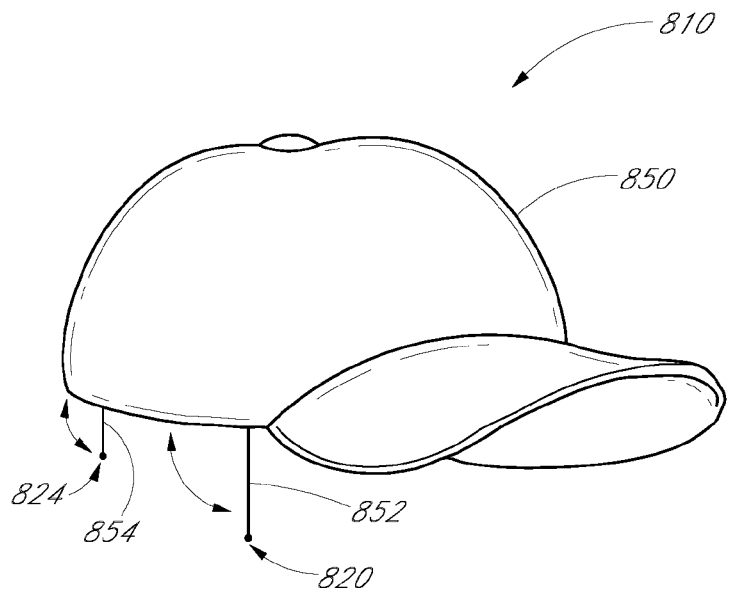
FIG. 10 is a side view of an eighth alternative embodiment, showing a hat with a built-in microphone and a built-in speaker.
Figure 11:
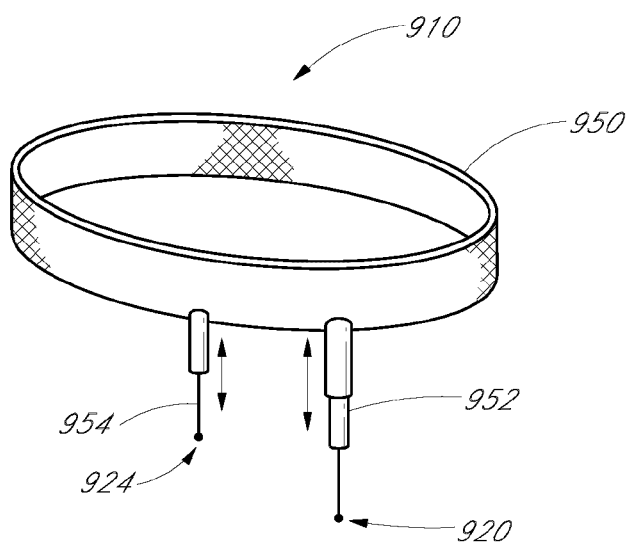
FIG. 11 is a perspective view of a ninth alternative embodiment, showing a headband with a built-in microphone and a built-in speaker.

FIGS. 10 and 11 show further alternative embodiments of the present invention. In these embodiments, the communication components are mounted to articles that users commonly wear on their head for fashion, warmth, or other reasons. The microphone is directional and oriented toward the user's mouth, and the speaker is disposed adjacent to and oriented toward the user's ear, thereby permitting the user to conveniently and privately communicate on his or her cell phone.

In particular, FIG. 10 shows an eighth alternative embodiment 810 comprising a hat that forms a frame 850, with the microphone 820 and the speaker 824 attached to the frame 850 by pivotal, telescopic, static, or other extension arms 852 and 854, respectively. Similarly, FIG. 11 shows a ninth alternative embodiment 910 comprising a headband that forms a frame 950, with the microphone 920 and the speaker 924 attached to the frame 950 by pivotal, telescopic, static, or other extension arms 952 and 954, respectively.

It will be understood that the term "hat" as used herein means any structure that is typically worn on a person's head, including a baseball cap, cowboy hat, motorcycle or sports helmet, visor, derby, bonnet, panama, sun hat, beret, tam-o'-shanter, yarmulke, beenie, fedora, and so forth. It will be further understood that, in addition to hats, the communication features can be provided on any other article worn on a person's head, such as earmuffs, ski masks, hoods on jackets, and so forth.

In view of the foregoing, it will be appreciated that present invention provides several wearable audio communication devices for remotely using a cell phone or other electronic device, that permit the user to easily, safely, and privately communicate using the cell phone, even while engaged in another activity. Furthermore, the devices provided by the invention obviate the need for the user to hold the cell phone in his hand to use the phone, or to carry around, put on, and remove a headset device to use the phone privately and hands-free.

While certain embodiments are described above with particularity, these should not be construed as limitations on the scope of the invention. It should be understood, therefore, that the foregoing relates only to exemplary embodiments of the present invention, and that numerous changes may be made therein without departing from the spirit and scope of the invention as defined by the following claims.

What is claimed is:

1. A communication device configured to be removably mountable to an eyewear configured to be worn by a user, the communication device comprising:
    a receiver configured to wirelessly receive signals from a first electronic device;
    a transmitter configured to wirelessly send signals;
    a power source electrically connected to the receiver and the transmitter for providing power to the receiver and the transmitter;
    a user communication component configured to communicate to the user, the user communication component being in communication with the receiver and attached to a generally rigid arm; and
    an attachment member comprising at least one connector configured to extend over a top region of a support arm of the eyewear, wherein the attachment member is configured to permit removable mounting of the communication device onto the eyewear.

2. The communication device of claim 1, further comprising the eyewear, wherein the communication device is removably mounted to the eyewear.

3. The communication device of claim 1, wherein the generally rigid arm is configured such that the user can conform the generally rigid arm to a shape of the eyewear.

4. The communication device of claim 1, wherein the user communication component comprises a speaker.

5. The communication device of claim 4, wherein the speaker is configured to be positioned adjacent a wearer's ear when the communication device is mounted on the eyewear.

6. The communication device of claim 1, wherein the first electronic device is configured to transmit a signal to a second electronic device.

7. The communication device of claim 1, wherein the second electronic device comprises a cell phone.

8. The communication device of claim 1, wherein the first electronic device comprises a cell phone.

9. The communication device of claim 1, wherein at least one of the received and transmitted signals comprise images.

10. The communication device of claim 1, wherein the attachment member is configured to position components of the communication device below the support arm.

11. A communication device configured to be removably mountable to an eyewear configured to be worn by a user, the communication device comprising:
    a receiver configured to wirelessly receive signals;
    a transmitter configured to wirelessly send signals;
    a power source electrically connected to the receiver and the transmitter for providing power to the receiver and the transmitter;
    a speaker in communication with the receiver; and
    an attachment member comprising a frame and at least one connector configured to extend over a top region of a support arm of the eyewear, wherein the attachment member is configured to permit removable mounting of the communication device onto the eyewear;

wherein the speaker is rigidly attached to the frame.

12. The combination of the communication device of claim 11, further comprising the eyewear, wherein the communication device is removably mounted to the eyewear.

13. The communication device of claim 11, wherein the communication device further comprises an arm configured to have another component of the user communication device attached thereto.

14. The communication device of claim 13, wherein the arm is configured such that a user can conform the arm to a shape of the eyewear.

15. The communication device of claim 13, wherein the arm is generally rigid and is configured to be conformable.

16. The communication device of claim 11, wherein the speaker is configured to be positioned adjacent a wearer's ear when communication device is mounted on the eyewear.

17. The communication device of claim 11, wherein the attachment member is configured to position components of the communication device below the support arm.

18. The communication device of claim 11, wherein at least one of the received and transmitted signals comprise images.

19. A communication device configured to be removably mountable to an eyewear configured to be worn by a user, the communication device comprising:

a receiver configured to wirelessly receive signals from a first electronic device;

a transmitter configured to wirelessly send signals;

a power source electrically connected to the receiver and the transmitter for providing power to the receiver and the transmitter;

a speaker configured to communicate to the user, the speaker being in communication with the receiver and rigidly attached to another component of the communication device; and an attachment member comprising at least one connector configured to extend over a top region of a support arm of the eyewear, wherein the attachment member is configured to permit removable mounting of the communication device onto the eyewear.

* * * * *

UNITED STATES PATENT AND TRADEMARK OFFICE
CERTIFICATE OF CORRECTION

| | |
|---|---|
| PATENT NO. | : 9,451,068 B2 |
| APPLICATION NO. | : 14/336872 |
| DATED | : September 20, 2016 |
| INVENTOR(S) | : Peter Warren |

Page 1 of 1

It is certified that error appears in the above-identified patent and that said Letters Patent is hereby corrected as shown below:

On the title page

In column 2 (page 7, item 56) at line 21, Under Other Publications, change "Memoray" to --Memory--.

In column 1 (page 8, item 56) at line 67, Under Other Publications, change "Conosumer" to --Consumer--.

In column 2 (page 8, item 56) at line 36, Under Other Publications, change "Applicances"," to --Appliances",--.

In column 2 (page 8, item 56) at line 37, Under Other Publications, change ".htrn." to --.htm.--.

In column 2 (page 9, item 56) at line 33, Under Other Publications, change "Frams"," to --Frames",--.

In the claims

In column 9 at line 5, In Claim 12, after "The" delete "combination of the".

Signed and Sealed this
Twentieth Day of December, 2016

Michelle K. Lee
*Director of the United States Patent and Trademark Office*